(12) United States Patent  
Chung et al.

(10) Patent No.: US 9,274,310 B1
(45) Date of Patent: Mar. 1, 2016

(54) OPTICAL IMAGING LENS

(71) Applicant: GLORY SCIENCE CO., LTD., Changhua Hsien (TW)

(72) Inventors: Feng-Chao Chung, Changhua Hsien (TW); Kun-Ti Liu, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 0 days.

(21) Appl. No.: 14/581,957

(22) Filed: Dec. 23, 2014

(51) Int. Cl.
| | |
|---|---|
| *G02B 13/02* | (2006.01) |
| *G02B 13/18* | (2006.01) |
| *G02B 9/08* | (2006.01) |
| *G02B 9/12* | (2006.01) |
| *G02B 13/00* | (2006.01) |
| *G02B 5/00* | (2006.01) |
| *G02B 9/06* | (2006.01) |
| *G02B 9/00* | (2006.01) |
| *G02B 3/04* | (2006.01) |

(52) U.S. Cl.
CPC .......... *G02B 13/0035* (2013.01); *G02B 13/18* (2013.01); *G02B 3/04* (2013.01); *G02B 5/005* (2013.01); *G02B 9/00* (2013.01); *G02B 9/06* (2013.01); *G02B 9/12* (2013.01); *G02B 13/001* (2013.01); *G02B 13/002* (2013.01); *G02B 13/0015* (2013.01)

(58) Field of Classification Search
CPC ...... G02B 13/0035; G02B 13/18; G02B 9/12; G02B 13/0015; G02B 13/001; G02B 3/04; G02B 13/002; G02B 5/005; G02B 9/00; G02B 9/06
USPC .................................. 359/716, 740, 784, 791
See application file for complete search history.

(56) References Cited

U.S. PATENT DOCUMENTS

| | | | | |
|---|---|---|---|---|
| 7,623,307 | B2* | 11/2009 | Noda .................. | G02B 5/1895 359/784 |
| 7,733,582 | B2* | 6/2010 | Nio ....................... | G02B 13/18 359/716 |
| 8,094,231 | B2 | 1/2012 | Tsai | |
| 8,743,486 | B2 | 6/2014 | Tsai et al. | |
| 2003/0210475 | A1* | 11/2003 | Shinohara ......... | G02B 13/0035 359/716 |
| 2008/0024880 | A1* | 1/2008 | Tang .................. | G02B 13/0035 359/716 |
| 2008/0266679 | A1* | 10/2008 | Nio ......................... | G02B 9/12 359/784 |
| 2010/0232041 | A1* | 9/2010 | Yin ..................... | G02B 13/0035 359/791 |
| 2013/0265650 | A1 | 10/2013 | Chen et al. | |
| 2013/0329306 | A1 | 12/2013 | Tsai et al. | |

* cited by examiner

*Primary Examiner* — Evelyn A Lester
(74) *Attorney, Agent, or Firm* — Gemini Patent Services, Inc.

(57) ABSTRACT

An optical imaging lens includes an aperture stop and an optical assembly, the optical assembly includes, in order from the object side to the image side: a first lens element with a positive refractive power; a second lens element with a positive refractive power; a third lens element with a negative refractive power; the aperture stop is located between an image-side surface of the first lens element and an object to be photographed; wherein a radius of curvature of an object-side surface of the first lens element is R1, a radius of curvature of the image-side surface of the first lens element is R2, a central thickness of the second lens element is CT2, a central thickness of the third lens element is CT3, and the following conditions are satisfied:

$$-2.0 < (R1+R2)/(R1-R2) < -0.2;\ 2.0 < CT2/CT3 < 4.0.$$

17 Claims, 19 Drawing Sheets

OPTICAL IMAGING LENS

BACKGROUND OF THE INVENTION

1. Field of the Invention

The present invention relates to an optical imaging lens, and more particularly to a miniaturized optical imaging lens applicable to electronic products.

2. Description of the Prior Art

In recent years, mobile devices are continuously renovated, making more and more intense competition. In addition, with the mature technology development of various components, the difference between products becomes smaller, the only competition is price. Therefore, how to reduce the manufacturing cost and maintain good quality has become the aim of manufacturer's efforts.

Currently, small imaging lens with high image quality has become the standard equipment for mobile devices. In addition, as the advanced semiconductor manufacturing technologies have allowed the pixel size of image sensors to be reduced and compact, which makes the imaging lens featuring finer resolution or providing wider angle of view by providing with more than five or six lens elements, such as the imaging lenses described in US Publication Nos. 20130265650 and 20130329306. However, the imaging lenses consisting of three lens elements disclosed in U.S. Pat. Nos. 8,743,486 and 8,094,231 have small angle of view and aperture value.

The present invention has been made in order to solve the above-mentioned problems.

SUMMARY OF THE INVENTION

The primary objective of the present invention is to provide an optical imaging lens having wider angle of view, high resolution, low manufacturing cost and low sensitivity to manufacture.

According to one aspect of the present invention, an optical imaging lens comprises an aperture stop and an optical assembly, the optical assembly comprises, in order from the object side to the image side: a first lens element with a positive refractive power having an aspheric object-side surface being convex near the optical axis and an aspheric image-side surface; a second lens element with a positive refractive power having an aspheric object-side surface being concave near the optical axis and an aspheric image-side surface being convex near the optical axis, the second lens element being made of plastic material; a third lens element with a negative refractive power having an aspheric object-side surface being convex near the optical axis and an aspheric image-side surface being concave near the optical axis, the third lens element being made of plastic material, at least one inflection point being formed on the object-side surface and the image-side surface of the third lens element; and the aperture stop being located between the image-side surface of the first lens element and an object to be photographed.

Wherein the radius of curvature of the object-side surface of the first lens element is R1, the radius of curvature of the image-side surface of the first lens element is R2, the central thickness of the second lens element is CT2, the central thickness of the third lens element is CT3, and the following conditions are satisfied:

$-2.0<(R1+R2)/(R1-R2)<-0.2;$ $2.0<CT2/CT3<4.0.$

If $(R1+R2)/(R1-R2)$ satisfies the above condition, the spherical aberration and astigmatism of the optical imaging lens can be reduced.

If CT2/CT3 satisfies the above condition, it will be favorable to correct the high order aberrations, so as to improve image quality.

Preferably, the radius of curvature of the object-side surface of the second lens element is R3, the radius of curvature of the image-side surface of the second lens element is R4, and the following condition is satisfied: $1.0<(R3+R4)/(R3-R4)<3.5$, which can reduce the astigmatism of the optical imaging lens.

Preferably, the radius of curvature of the image-side surface of the third lens element is R6, the focal length of the optical imaging lens is f, and the following condition is satisfied: $0.1<R6/f<0.36$, it can reduce the field curvature and astigmatism.

Preferably, the central thickness of the second lens element is CT2, the distance along an optical axis between the first lens element and the second lens element is T12, and the following condition is satisfied: $1.2<CT2/T12<2.5$, which can enlarge the field of view.

Preferably, the Abbe number of the first lens element is V1, the Abbe number of the second lens element is V2, the Abbe number of the third lens element is V3, and the following conditions are satisfied: $20<V2-V3<40$ and $|V1-V2|<10$, which can reduce the chromatic aberration of the optical imaging lens.

Preferably, the distance along the optical axis between the first lens element and the second lens element is T12, the central thickness of the second lens element is CT2, the distance along the optical axis between the object-side surface of the first lens element and the image-side surface of the third lens element is TD, and the following condition is satisfied: $0.55<(T12+CT2)/TD<0.75$, it can reduce the track length of the optical imaging lens and the manufacturing difficulties as well as sensitivity to assembly of the second lens element.

Preferably, the focal length of the optical imaging lens is f, the focal length of the second lens element is f2, and the following condition is satisfied: $0.3<f2/f<1.5$, so that the refractive power of the second lens element can be maintained in the appropriate range, which can balance the refractive power of the first lens element and reduce the sensitivity to assembly of the first and second lens elements.

Preferably, the focal length of the optical imaging lens is f, the radius of curvature of the image-side surface of the first lens element is R2, and the following condition is satisfied: $-0.5<f/R2<1$, it can reduce the sensitivity to surface decenter of the image-side surface of the first lens element.

Preferably, the refractive index of the second lens element is N2, the refractive index of the third lens element is N3, and the following conditions are satisfied: $1.5<N2<1.58$ and $1.57<N3<1.68$, so the second and third lens elements are selected to be made of plastic material.

According to another aspect of the present invention, an optical imaging lens comprises an aperture stop and an optical assembly, the optical assembly comprises, in order from the object side to the image side: a first lens element with a positive refractive power having an aspheric object-side surface being convex near the optical axis and an aspheric image-side surface; a second lens element with a positive negative refractive power having an aspheric object-side surface being concave near the optical axis and an aspheric image-side surface being convex near the optical axis, the second lens element being made of plastic material; a third lens element with a negative refractive power having an aspheric object-side surface being convex near the optical axis and an aspheric image-side surface being concave near the optical axis, the third lens element being made of plastic material, and at least one inflection point being formed on the object-side surface and the image-side surface of the third lens element.

Wherein the central thickness of the second lens element is CT2, the central thickness of the third lens element is CT3, the Abbe number of the first lens element is V1, the Abbe number of the second lens element is V2, the Abbe number of the third lens element is V3, the distance along the optical axis between the aperture stop and the image-side surface of the third lens element is SD, the distance along the optical axis between the object-side surface of the first lens element and the image-side surface of the third lens element is TD, and the following conditions are satisfied:

$2.0<CT2/CT3<4.0;$ $20<V2-V3<40$ and $|V1-V2|<10;$ $0.9<SD/TD<1.05.$

If CT2/CT3 satisfies the above condition, it will be favorable to correct the high order aberrations, so as to improve image quality.

If V2-V3 and |V1-V2| satisfy the above condition, the chromatic aberration of the optical imaging lens can be reduced.

If SD/TD satisfies the above condition, it can make the chief ray angle with respect to the image plane of the optical imaging lens cooperated with the electronic sensor that is disposed on the image plane, so as to avoid causing color shift as well as the dark corner phenomenon.

Preferably, the radius of curvature of the object-side surface of the third lens element is R5, the radius of curvature of the image-side surface of the third lens element is R6, and the following condition is satisfied: $1.3<(R5+R6)/(R5-R6)<7$, it can reduce the field curvature.

Preferably, the distance in parallel with the optical axis from an axial vertex on the image-side surface of the second lens element to a maximum effective radius position on the image-side surface of the second lens element is SAG_22, the distance along the optical axis between the object-side surface of the first lens element and the image-side surface of the third lens element is TD, and the following condition is satisfied: $0.2<|SAG\_22/TD|<0.4$, which can reduce the chromatic aberration of magnification caused by the peripheral positive refractive power of the third lens element effectively.

Preferably, the focal length of the optical imaging lens is f, the radius of curvature of the object-side surface of the first lens element is R1, and the following condition is satisfied: $0.3<R1/f<1.5$, it can reduce the sensitivity to surface decenter of the object-side surface of the first lens element and the track length of the optical imaging lens.

Preferably, the focal length of the optical imaging lens is f, the focal length of the second lens element is f2, and the following condition is satisfied: $0.3<f2/f<1.5$, so that the refractive power of the second lens element can be maintained in the appropriate range, which can balance the refractive power of the first lens element and reduce the sensitivity to assembly of the first and second lens elements.

Preferably, the radius of curvature of the object-side surface of the first lens element is R1, the radius of curvature of the image-side surface of the first lens element is R2, and the following condition is satisfied: $-2.0<(R1+R2)/(R1-R2)<-0.2$, it can reduce the spherical aberration and astigmatism of the optical imaging lens.

Preferably, the maximal field of view of the optical imaging lens is FOV, and the following condition is satisfied: $75<FOV<95$, which can obtain wider field of view and larger shooting range.

Preferably, the central thickness of the second lens element is CT2, the distance along an optical axis between the first lens element and the second lens element is T12, and the following condition is satisfied: $1.2<CT2/T12<2.5$, which can enlarge the field of view.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
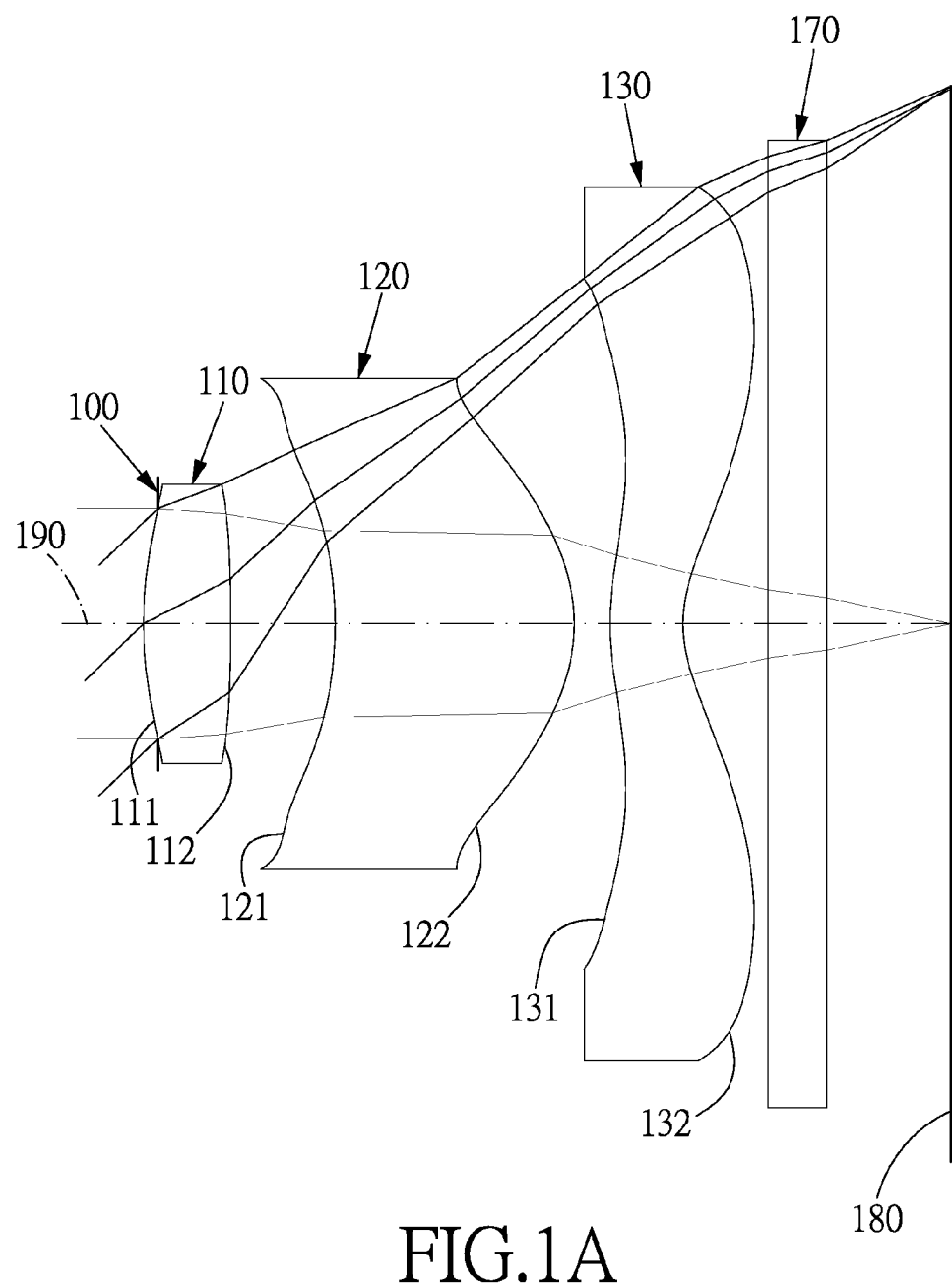
FIG. 1A shows an optical imaging lens in accordance with a first embodiment of the present invention.
Figure 1B:
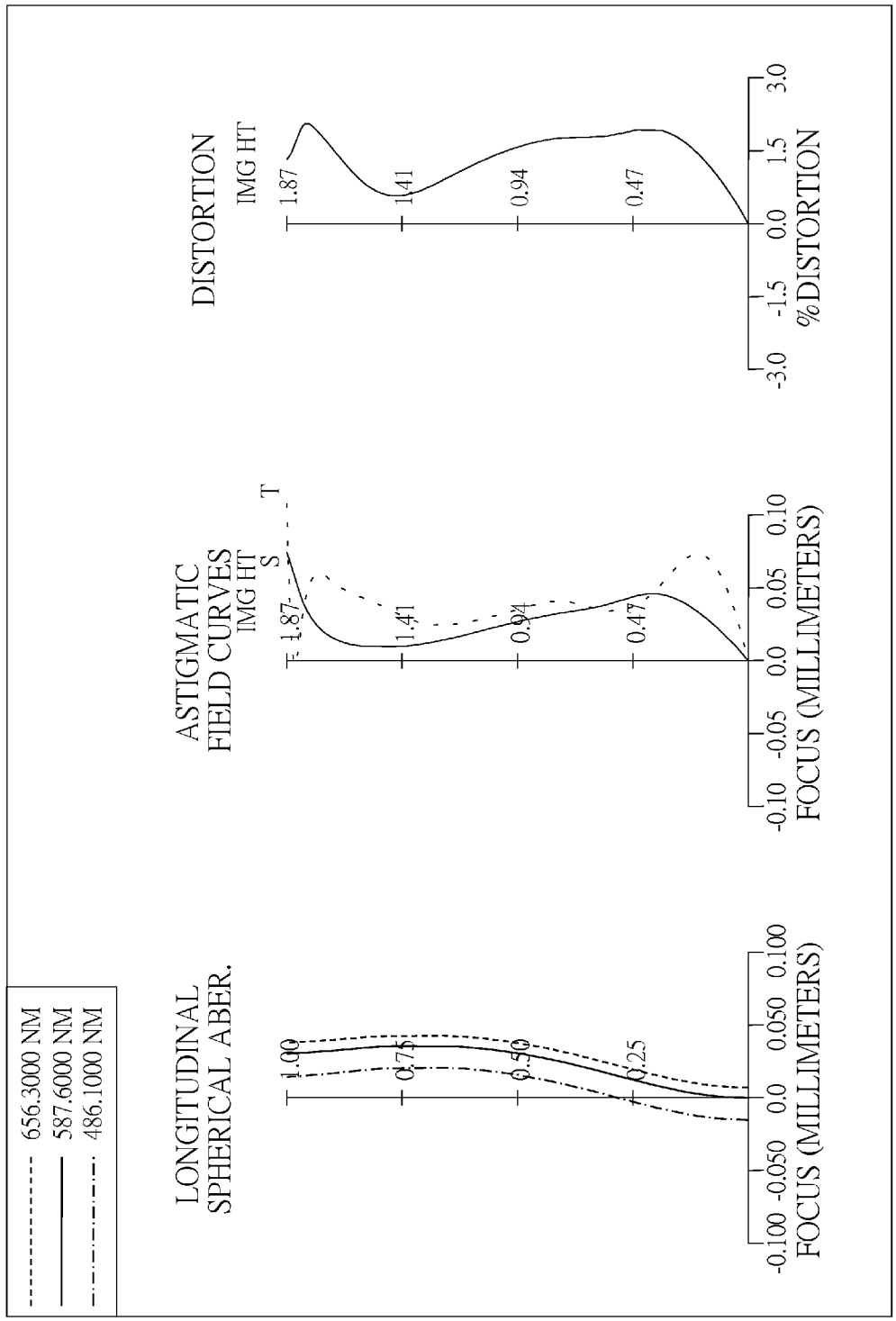
FIG. 1B shows the longitudinal spherical aberration curve, the astigmatic field curve and the distortion curve of the first embodiment of the present invention.

FIG. 1A shows an optical imaging lens in accordance with a first embodiment of the present invention, and FIG. 1B shows, in order from left to right, the longitudinal spherical aberration curves, the astigmatic field curves, and the distortion curve of the first embodiment of the present invention. An optical imaging lens in accordance with the first embodiment of the present invention comprises an aperture stop 100 and an optical assembly. The optical assembly comprises, in order from an object side to an image side: a first lens element 110, a second lens element 120, a third lens element 130, an IR cut filter 170 and an image plane 180, wherein the optical imaging lens has a total of three lens elements with refractive power. The aperture stop 100 is located between an image-side surface 112 of the first lens element 110 and an object to be photographed.

The first lens element 110 with a positive refractive power has an object-side surface 111 being convex near an optical axis 190 and the image-side surface 112 being convex near the optical axis 190, both the object-side and image-side surfaces 111, 112 are aspheric, and the first lens element 110 is made of plastic material.

The second lens element 120 with a positive refractive power has an object-side surface 121 being concave near the optical axis 190 and an image-side surface 122 being convex near the optical axis 190, both the object-side and image-side surfaces 121, 122 are aspheric, and the second lens element 120 is made of plastic material.

The third lens element 130 with a negative refractive power has an object-side surface 131 being convex near the optical axis 190 and an image-side surface 132 being concave near the optical axis 190, both the object-side and image-side surfaces 131, 132 are aspheric, the third lens element 130 is made of plastic material, and more than one inflection point is formed on the object-side surface 131 and the image-side surface 132 of the third lens element 130.

The IR cut filter 170 made of glass is located between the third lens element 130 and the image plane 180 and has no influence on the focal length of the optical imaging lens.

The equation for the aspheric surface profiles of the first embodiment is expressed as follows:

$$z(h) = \frac{ch^2}{1 + \sqrt{1 - (1+k)c^2 h^2}} + A_4 h^4 + A_6 h^6 + A_8 h^8 + A_{10} h^{10} + A_{12} h^{12} + A_{14} h^{14} + \ldots$$

z represents the distance of a point on the aspheric surface at a height h from the optical axis 190 relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis 190;

k represents the conic constant;

$A_4$, $A_6$, $A_8$, $A_{10}$, $A_{12}$, $A_{14}$ . . . : represent the high-order aspheric coefficients.

In the first embodiment of the present optical imaging lens, the focal length of the optical imaging lens is f, the f-number of the optical imaging lens is Fno, half of the maximal field of view of the optical imaging lens is HFOV, and the following conditions are satisfied:

f=1.94 mm, Fno=2.4, and HFOV=43.55 degrees.

In the first embodiment of the present optical imaging lens, the maximal field of view of the optical imaging lens is FOV, and the following condition is satisfied:

FOV=87.10.

In the first embodiment of the present optical imaging lens, the radius of curvature of the object-side surface 111 of the first lens element 110 is R1, the radius of curvature of the image-side surface 112 of the first lens element 110 is R2, and the following condition is satisfied:

(R1+R2)/(R1−R2)=−1.41.

In the first embodiment of the present optical imaging lens, the central thickness of the second lens element 120 is CT2, the central thickness of the third lens element 130 is CT3, and the following condition is satisfied:

CT2/CT3=3.28.

In the first embodiment of the present optical imaging lens, the radius of curvature of the object-side surface 121 of the second lens element 120 is R3, the radius of curvature of the image-side surface 122 of the second lens element 120 is R4, and the following condition is satisfied:

(R3+R4)/(R3−R4)=2.43.

In the first embodiment of the present optical imaging lens, the radius of curvature of the image-side surface 132 of the third lens element 130 is R6, the focal length of the optical imaging lens is f, and the following condition is satisfied:

R6/f=0.23.

In the first embodiment of the present optical imaging lens, the central thickness of the second lens element 120 is CT2, the distance along the optical axis 190 between the first lens element 110 and the second lens element 120 is T12, and the following condition is satisfied:

CT2/T12=2.29.

In the first embodiment of the present optical imaging lens, the Abbe number of the first lens element 110 is V1, the Abbe number of the second lens element 120 is V2, the Abbe number of the third lens element 130 is V3, and the following conditions are satisfied:

V2−V3=35.00;

|V1−V2|=0.

In the first embodiment of the present optical imaging lens, the distance along the optical axis 190 between the first lens element 110 and the second lens element 120 is T12, the central thickness of the second lens element 120 is CT2, the distance along the optical axis between the object-side surface 111 of the first lens element 110 and the image-side surface 132 of the third lens element 130 is TD, and the following condition is satisfied:

(T12+CT2)/TD=0.64.

In the first embodiment of the present optical imaging lens, the focal length of the optical imaging lens is f, the focal length of the second lens element 120 is f2, and the following condition is satisfied:

f2/f=0.78.

In the first embodiment of the present optical imaging lens, the focal length of the optical imaging lens is f, the radius of curvature of the image-side surface 112 of the first lens element 110 is R2, and the following condition is satisfied:

f/R2=−0.22.

In the first embodiment of the present optical imaging lens, the refractive index of the second lens element 120 is N2, the refractive index of the third lens element 130 is N3, and the following conditions are satisfied:

$N2=1.515$;

$N3=1.642$.

In the first embodiment of the present optical imaging lens, the distance along the optical axis between the aperture stop 100 and the image-side surface 132 of the third lens element 130 is SD, the distance along the optical axis between the object-side surface 111 of the first lens element 110 and the image-side surface 132 of the third lens element 130 is TD, and the following condition is satisfied:

$SD/TD=1.00$.

In the first embodiment of the present optical imaging lens, the radius of curvature of the object-side surface 131 of the third lens element 130 is R5, the radius of curvature of the image-side surface 132 of the third lens element 130 is R6, and the following condition is satisfied:

$(R5+R6)/(R5-R6)=2.82$.

Figure 10:
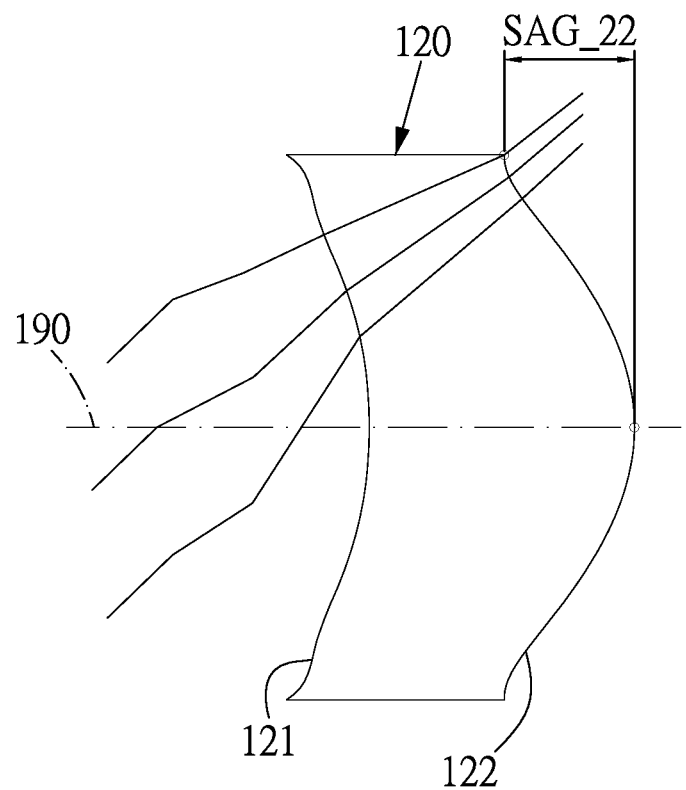
FIG. 10 shows a distance SAG_22 of a second lens element of FIG. 1A.

Referring to FIG. 10, in the first embodiment of the present optical imaging lens, the distance in parallel with the optical axis 190 from an axial vertex on the image-side surface 122 of the second lens element 120 to a maximum effective radius position on the image-side surface 122 of the second lens element 120 is SAG 22, the distance along the optical axis 190 between the object-side surface 111 of the first lens element 110 and the image-side surface 132 of the third lens element 130 is TD, and the following condition is satisfied:

$|SAG\_22/TD|=0.22$.

In the first embodiment of the present optical imaging lens, the focal length of the optical imaging lens is f, the radius of curvature of the object-side surface 111 of the first lens element 110 is R1, and the following condition is satisfied:

$R1/f=0.78$.

The detailed optical data of the first embodiment is shown in Table 1, and the aspheric surface data is shown in Table 2.

TABLE 1

(Embodiment 1)
f (focal length) = 1.94 mm, Fno = 2.4, HFOV = 43.55 deg.

| Surface | | Curvature Radius | Thickness | Material | index | Abbe # | Focal length |
|---|---|---|---|---|---|---|---|
| 0 | Object | Plane | Infinity | | | | |
| 1 (Aperture stop) | Lens 1 | 1.51 (ASP) | 0.31 | Plastic | 1.515 | 57.0 | 2.53 |
| 2 | | −8.91 (ASP) | 0.37 | | | | |
| 3 | Lens 2 | −1.47 (ASP) | 0.85 | Plastic | 1.515 | 57.0 | 1.52 |
| 4 | | −0.61 (ASP) | 0.13 | | | | |
| 5 | Lens 3 | 0.95 (ASP) | 0.26 | Plastic | 1.642 | 22.0 | −1.68 |
| 6 | | 0.45 (ASP) | 0.30 | | | | |
| 7 | IR-filter | Plane | 0.21 | Glass | 1.517 | 64.2 | |
| 8 | | Plane | 0.44 | | | | |
| 9 | Image | Plane | 0 | | | | |

Note:
Reference wavelength is 587.6 nm.

TABLE 2

Aspheric Coefficients

| Surface # | 1 | 2 | 3 |
|---|---|---|---|
| K = | −2.0000E+01 | −2.0000E+01 | −1.3868E+01 |
| A4 = | 5.7719E−01 | −2.2185E−01 | −6.0285E−01 |
| A6 = | −2.7982E+00 | −3.7423E−01 | −5.1521E−01 |
| A8 = | 7.8476E+00 | 5.3999E−01 | 4.2973E+00 |
| A10 = | −1.5357E+01 | −3.5228E+00 | −3.2765E+00 |
| A12 = | −1.3359E−01 | 2.6834E+00 | −7.9978E−01 |
| A14 = | 6.6960E−01 | 0.0000E+00 | 2.3561E−09 |

| Surface # | 4 | 5 | 6 |
|---|---|---|---|
| K = | −2.6352E+00 | −2.0000E+01 | −4.4523E+00 |
| A4 = | −5.1716E−01 | −4.0463E−01 | −3.7943E−01 |
| A6 = | 1.2495E+00 | 1.8777E−01 | 3.9587E−01 |
| A8 = | −2.7770E+00 | 2.4741E−01 | −2.8206E−01 |
| A10 = | 3.2382E+00 | −4.4163E−01 | 1.1301E−01 |
| A12 = | −1.3536E−03 | 2.9039E−01 | −1.9795E−02 |
| A14 = | −1.0881E+00 | −7.4260E−02 | 3.7188E−04 |

The units of the radius of curvature, the thickness and the focal length in table 1 are expressed in mm, in the tables 1 and 2, the surface numbers 0-9 represent the surfaces sequentially arranged from the object-side to the image-side along the optical axis, and in table 2, k represents the conic coefficient of the equation of the aspheric surface profiles, and $A_4$, $A_6$, $A_8$, $A_{10}$, $A_{12}$, $A_{14}$ . . . : represent the high-order aspheric coefficients arranging from the 4th order to the 14th order. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
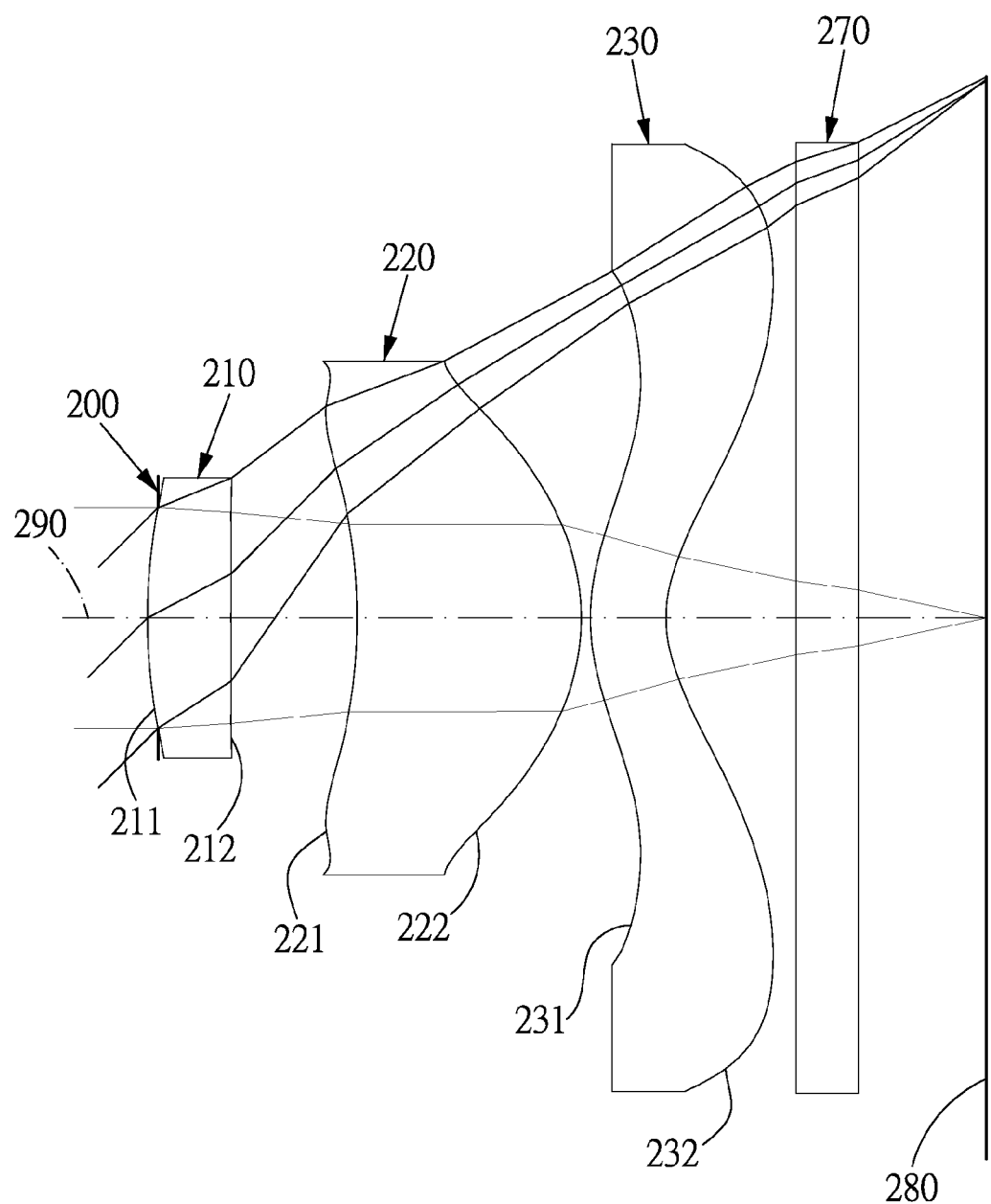
FIG. 2A shows an optical imaging lens in accordance with a second embodiment of the present invention.
Figure 2B:
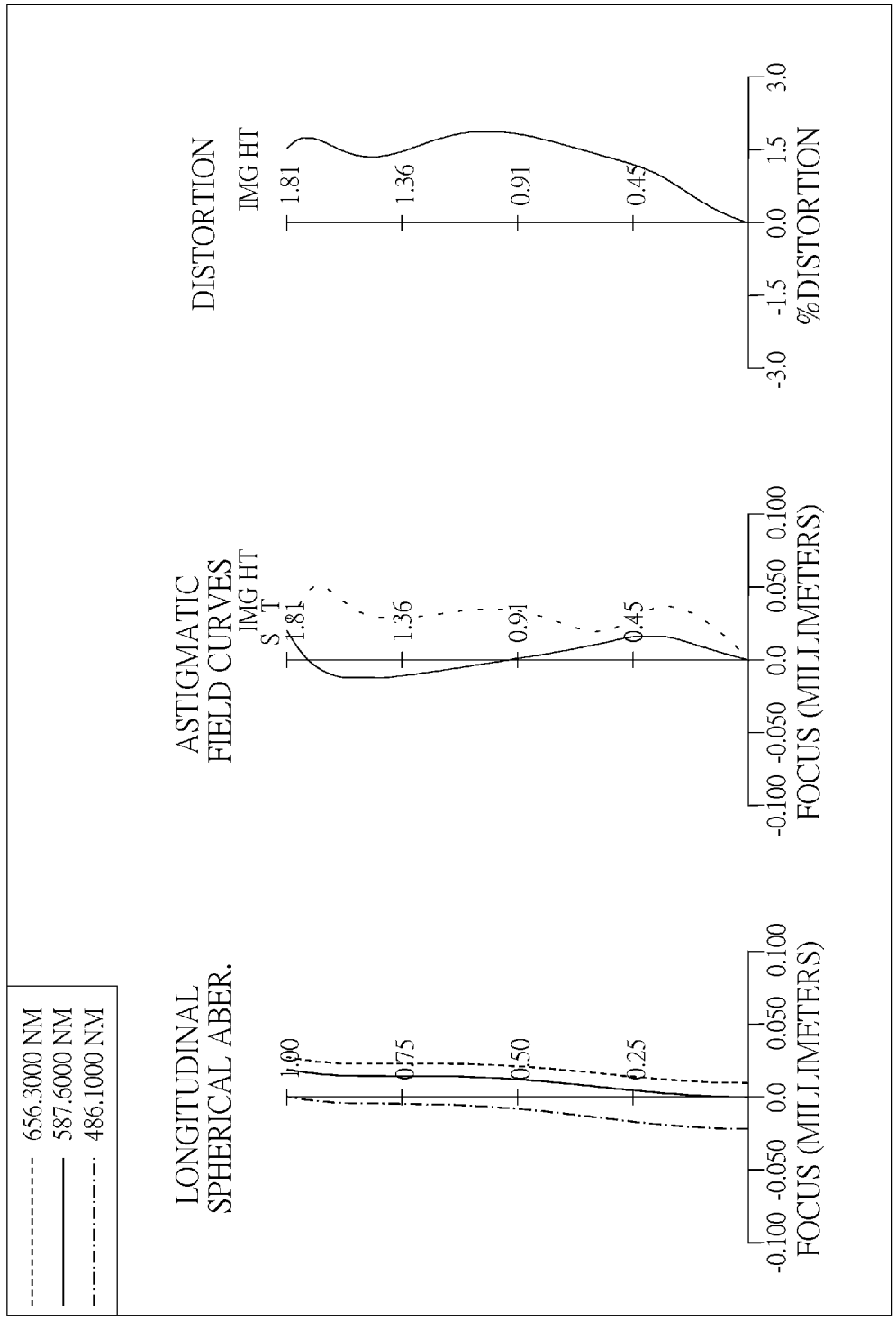
FIG. 2B shows the longitudinal spherical aberration curve, the astigmatic field curve and the distortion curve of the second embodiment of the present invention.

FIG. 2A shows an optical imaging lens in accordance with a second embodiment of the present invention, and FIG. 2B shows, in order from left to right, the longitudinal spherical aberration curves, the astigmatic field curves, and the distortion curve of the second embodiment of the present invention. An optical imaging lens in accordance with the second embodiment of the present invention comprises an aperture stop 200 and an optical assembly. The optical assembly comprises, in order from an object side to an image side: a first lens element 210, a second lens element 220, a third lens element 230, an IR cut filter 270 and an image plane 280, wherein the optical imaging lens has a total of three lens elements with refractive power. The aperture stop 200 is located between an image-side surface 212 of the first lens element 210 and an object to be photographed.

The first lens element 210 with a positive refractive power has an object-side surface 211 being convex near an optical axis 290 and the image-side surface 212 being convex near the optical axis 290, both the object-side and image-side surfaces 211, 212 are aspheric, and the first lens element 210 is made of plastic material.

The second lens element 220 with a positive refractive power has an object-side surface 221 being concave near the optical axis 290 and an image-side surface 222 being convex near the optical axis 290, both the object-side and image-side surfaces 221, 222 are aspheric, and the second lens element 220 is made of plastic material.

The third lens element 230 with a negative refractive power has an object-side surface 231 being convex near the optical axis 290 and an image-side surface 232 being concave near the optical axis 290, both the object-side and image-side surfaces 231, 232 are aspheric, the third lens element 230 is made of plastic material, and more than one inflection point is formed on the object-side surface 231 and the image-side surface 232 of the third lens element 230.

The IR cut filter 270 made of glass is located between the third lens element 230 and the image plane 280 and has no influence on the focal length of the optical imaging lens.

The detailed optical data of the second embodiment is shown in Table 3 and the aspheric surface data is shown in Table 4 below.

TABLE 3

(Embodiment 2)
f (focal length) = 1.789 mm, Fno = 2.4, HFOV = 44.91 deg.

| Surface | | Curvature Radius | Thickness | Material | index | Abbe # | Focal length |
|---|---|---|---|---|---|---|---|
| 0 | Object | Plane | Infinity | | | | |
| 1 (Aperture stop) | Lens 1 | 1.88 (ASP) | 0.29 | Plastic | 1.535 | 55.6 | 3.47 |
| 2 | | −150.24 (ASP) | 0.43 | | | | |
| 3 | Lens 2 | −1.83 (ASP) | 0.77 | Plastic | 1.535 | 55.6 | 1.91 |
| 4 | | −0.75 (ASP) | 0.03 | | | | |
| 5 | Lens 3 | 0.69 (ASP) | 0.26 | Plastic | 1.642 | 22.0 | −4.08 |
| 6 | | 0.47 (ASP) | 0.45 | | | | |
| 7 | IR-filter | Plane | 0.21 | Glass | 1.517 | 64.2 | |
| 8 | | Plane | 0.44 | | | | |
| 9 | Image | Plane | 0 | | | | |

Note:
Reference wavelength is 587.6 nm.

TABLE 4

Aspheric Coefficients

| Surface # | 1 | 2 | 3 |
|---|---|---|---|
| K = | −2.2340E+01 | −9.0000E+01 | −2.4342E+01 |
| A4 = | 3.7172E−01 | 2.4821E−02 | −2.7366E−01 |
| A6 = | −1.3601E+00 | −2.9942E−01 | −8.9916E−01 |
| A8 = | 5.2340E+00 | 2.9916E+00 | 3.6729E+00 |
| A10 = | −1.1127E+01 | −3.9976E+00 | −1.7210E+00 |
| A12 = | −6.1151E−02 | 1.2283E+00 | 1.5478E−02 |
| A14 = | 2.6592E−01 | 0.0000E+00 | −1.6454E+00 |

| Surface # | 4 | 5 | 6 |
|---|---|---|---|
| K = | −1.5575E+00 | −3.8083E+00 | −2.3273E+00 |
| A4 = | −3.3182E−01 | −3.1029E−01 | −4.8482E−01 |
| A6 = | 7.9890E−01 | −9.3124E−02 | 4.7293E−01 |
| A8 = | −1.9226E+00 | 3.1761E−01 | −3.3949E−01 |
| A10 = | 1.7233E+00 | −2.5735E−01 | 1.5970E−01 |
| A12 = | 1.6774E−01 | 1.3008E−01 | −4.1991E−02 |
| A14 = | −1.3674E−01 | −3.6824E−02 | 4.2521E−03 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

Embodiment 2

| Fno | 2.40 | (T12 + CT2)/TD | 0.68 |
|---|---|---|---|
| FOV | 89.82 | f2/f | 1.07 |
| (R1 + R2)/(R1 − 2) | −1.03 | f/R2 | −0.01 |
| CT2/CT3 | 2.95 | N2 | 1.535 |
| (R3 + R4)/(R3 − R4) | 2.39 | N3 | 1.642 |
| R6/f | 0.26 | SD/TD | 1.00 |
| CT2/T12 | 1.78 | (R5 + R6)/(R5 − R6) | 5.15 |
| V2 − V3 | 33.60 | \| SAG_22/TD \| | 0.26 |
| \| V1 − V2 \| | 0.00 | R1/f | 1.05 |

Figure 3A:
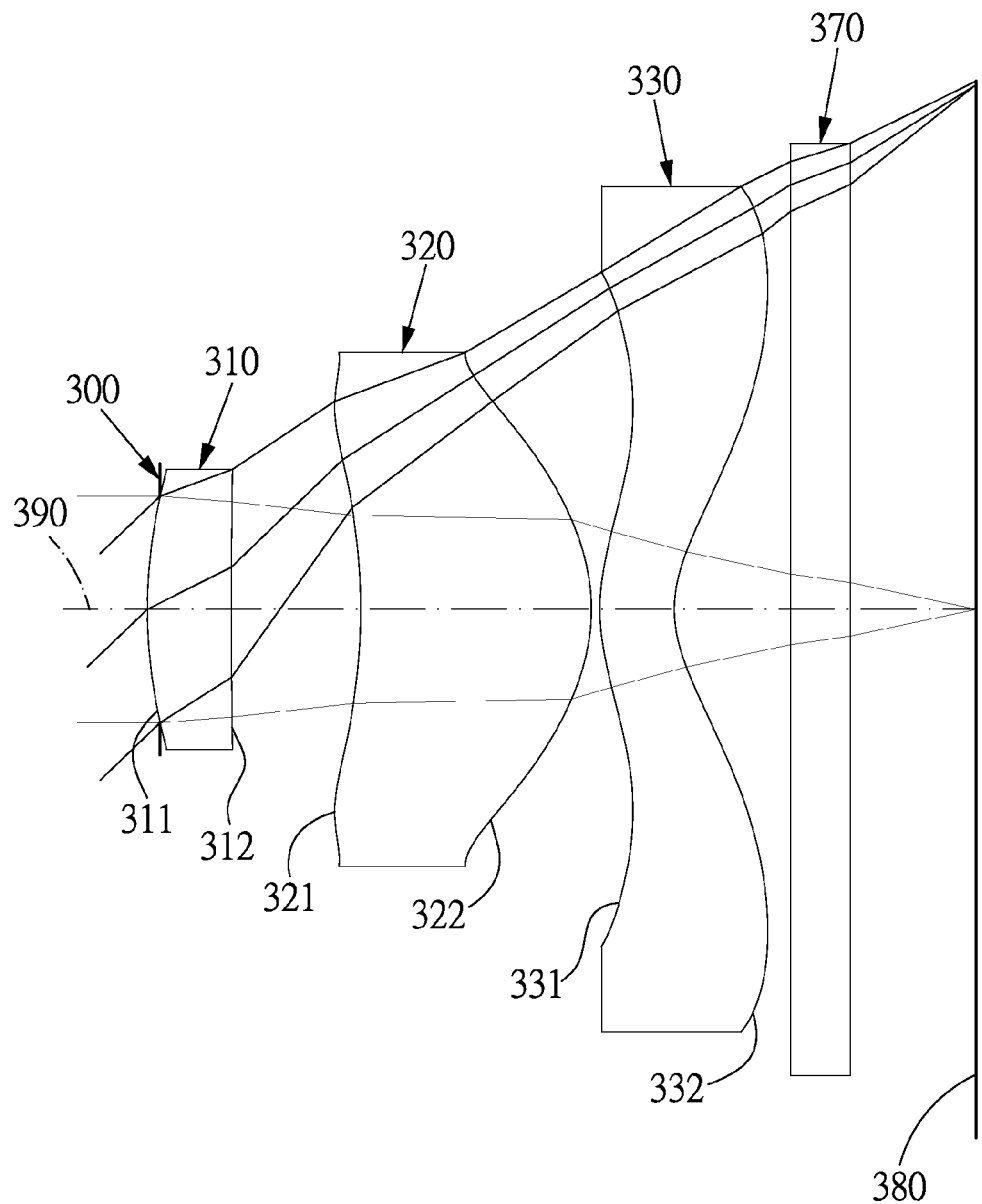
FIG. 3A shows an optical imaging lens in accordance with a third embodiment of the present invention.
Figure 3B:
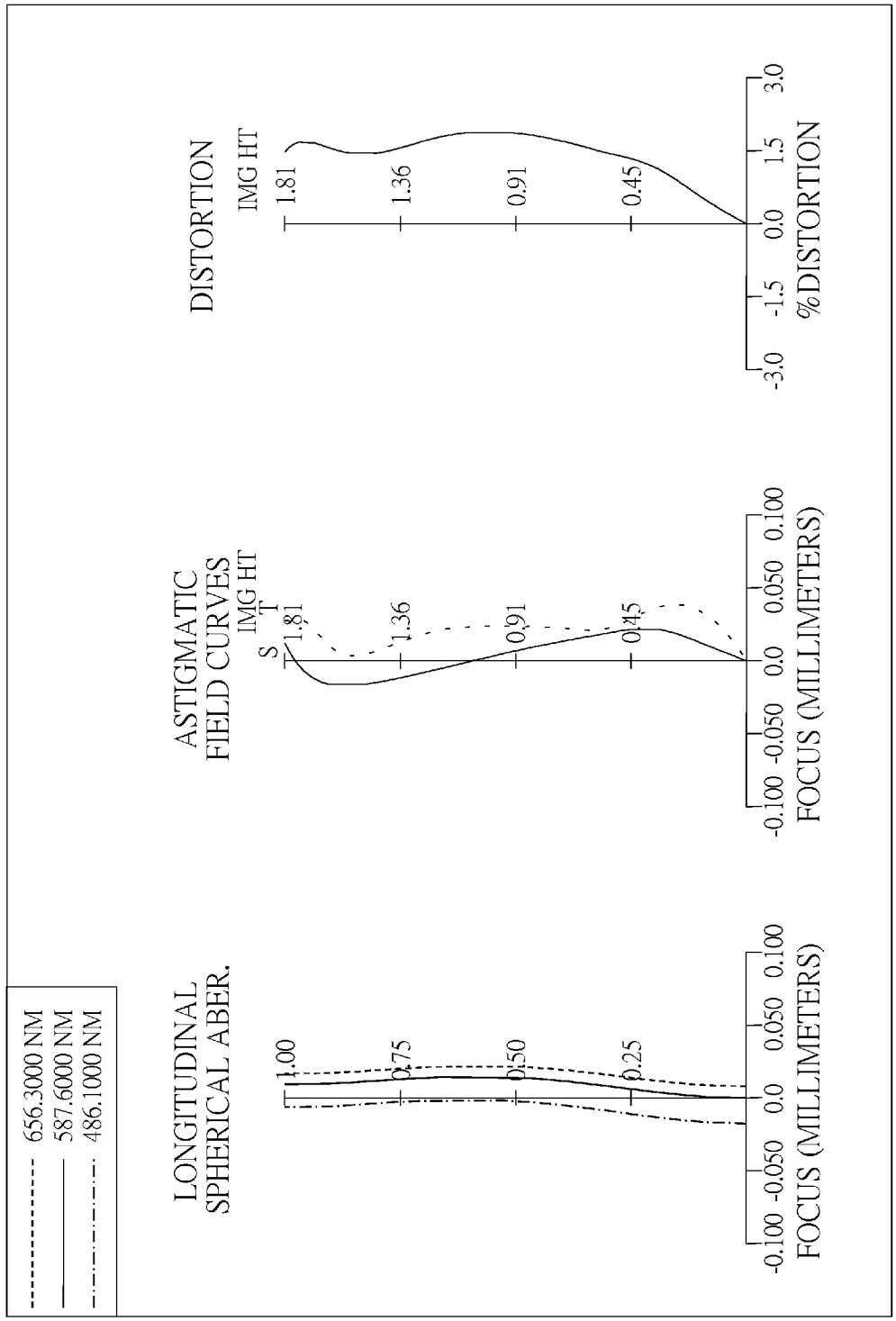
FIG. 3B shows the longitudinal spherical aberration curve, the astigmatic field curve and the distortion curve of the third embodiment of the present invention.

FIG. 3A shows an optical imaging lens in accordance with a third embodiment of the present invention, and FIG. 3B shows, in order from left to right, the longitudinal spherical aberration curves, the astigmatic field curves, and the distortion curve of the third embodiment of the present invention. An optical imaging lens in accordance with the third embodiment of the present invention comprises an aperture stop 300 and an optical assembly. The optical assembly comprises, in order from an object side to an image side: a first lens element 310, a second lens element 320, a third lens element 330, an IR cut filter 370 and an image plane 380, wherein the optical imaging lens has a total of three lens elements with refractive power. The aperture stop 300 is located between an image-side surface 312 of the first lens element 310 and an object to be photographed.

The first lens element 310 with a positive refractive power has an object-side surface 311 being convex near an optical axis 390 and the image-side surface 312 being concave near the optical axis 390, both the object-side and image-side surfaces 311, 312 are aspheric, and the first lens element 310 is made of plastic material.

The second lens element 320 with a positive refractive power has an object-side surface 321 being concave near the optical axis 390 and an image-side surface 322 being convex near the optical axis 390, both the object-side and image-side surfaces 321, 322 are aspheric, and the second lens element 320 is made of plastic material.

The third lens element 330 with a negative refractive power has an object-side surface 331 being convex near the optical axis 390 and an image-side surface 332 being concave near the optical axis 390, both the object-side and image-side surfaces 331, 332 are aspheric, the third lens element 330 is made of plastic material, and more than one inflection point is formed on the object-side surface 331 and the image-side surface 332 of the third lens element 330.

The IR cut filter 370 made of glass is located between the third lens element 330 and the image plane 380 and has no influence on the focal length of the optical imaging lens.

The detailed optical data of the third embodiment is shown in Table 5 and the aspheric surface data is shown in Table 6 below.

TABLE 5

(Embodiment 3)
f (focal length) = 1.884 mm, Fno = 2.4, HFOV = 43.46 deg.

| Surface | | Curvature Radius | Thickness | Material | index | Abbe # | Focal length |
|---|---|---|---|---|---|---|---|
| 0 | Object | Plane | Infinity | | | | |
| 1 (Aperture stop) | Lens 1 | 1.70 (ASP) | 0.29 | Plastic | 1.535 | 55.6 | 3.31 |
| 2 | | 39.76 (ASP) | 0.45 | | | | |

TABLE 5-continued (Embodiment 3)
f (focal length) = 1.884 mm, Fno = 2.4, HFOV = 43.46 deg.

| Surface | | Curvature Radius | Thickness | Material | index | Abbe # | Focal length |
|---|---|---|---|---|---|---|---|
| 3 | Lens 2 | −2.13 (ASP) | 0.81 | Plastic | 1.535 | 55.6 | 1.52 |
| 4 | | −0.66 (ASP) | 0.03 | | | | |
| 5 | Lens 3 | 0.76 (ASP) | 0.26 | Plastic | 1.642 | 22.0 | −2.13 |
| 6 | | 0.42 (ASP) | 0.41 | | | | |
| 7 | IR-filter | Plane | 0.21 | Glass | 1.517 | 64.2 | |
| 8 | | Plane | 0.44 | | | | |
| 9 | Image | Plane | 0 | | | | |

Note:
Reference wavelength is 587.6 nm.

TABLE 6

Aspheric Coefficients

| | Surface # | | |
|---|---|---|---|
| | 1 | 2 | 3 |
| K = | −1.8119E+01 | 9.0000E+01 | −2.9818E+01 |
| A4 = | 4.0240E−01 | 1.5608E−03 | −1.9159E−01 |
| A6 = | −1.1476E+00 | −4.6060E−02 | −7.8844E−01 |
| A8 = | 3.2123E+00 | 1.1443E+00 | 3.4042E+00 |
| A10 = | −5.5214E+00 | −1.9927E+00 | −2.4247E+00 |
| A12 = | −6.1151E−02 | 1.2283E+00 | −3.6089E−01 |
| A14 = | 2.6592E−01 | 0.0000E+00 | 2.4750E−01 |

| | Surface # | | |
|---|---|---|---|
| | 4 | 5 | 6 |
| K = | −2.8746E+00 | −6.2670E+00 | −3.0687E+00 |
| A4 = | −4.3627E−01 | −3.7315E−01 | −4.3422E−01 |
| A6 = | 7.8045E−01 | 1.3279E−02 | 4.4300E−01 |
| A8 = | −1.7089E+00 | 2.7075E−01 | −3.2431E−01 |
| A10 = | 1.8448E+00 | −2.4062E−01 | 1.5079E−01 |
| A12 = | 4.1042E−02 | 1.1732E−01 | −3.8152E−02 |
| A14 = | −4.2449E−01 | −3.1598E−02 | 3.6198E−03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| Embodiment 3 | | | |
|---|---|---|---|
| Fno | 2.40 | (T12 + CT2)/TD | 0.68 |
| FOV | 86.92 | f2/f | 0.81 |
| (R1 + R2)/(R1 − R2) | −0.92 | f/R2 | 0.05 |
| CT2/CT3 | 3.11 | N2 | 1.535 |
| (R3 + R4)/(R3 − R4) | 1.91 | N3 | 1.642 |
| R6/f | 0.22 | SD/TD | 1.00 |
| CT2/T12 | 1.79 | (R5 + R6)/(R5 − R6) | 3.52 |
| V2 − V3 | 33.60 | \|SAG_22/TD\| | 0.24 |
| \|V1 − V2\| | 0.00 | R1/f | 0.90 |

Figure 4A:
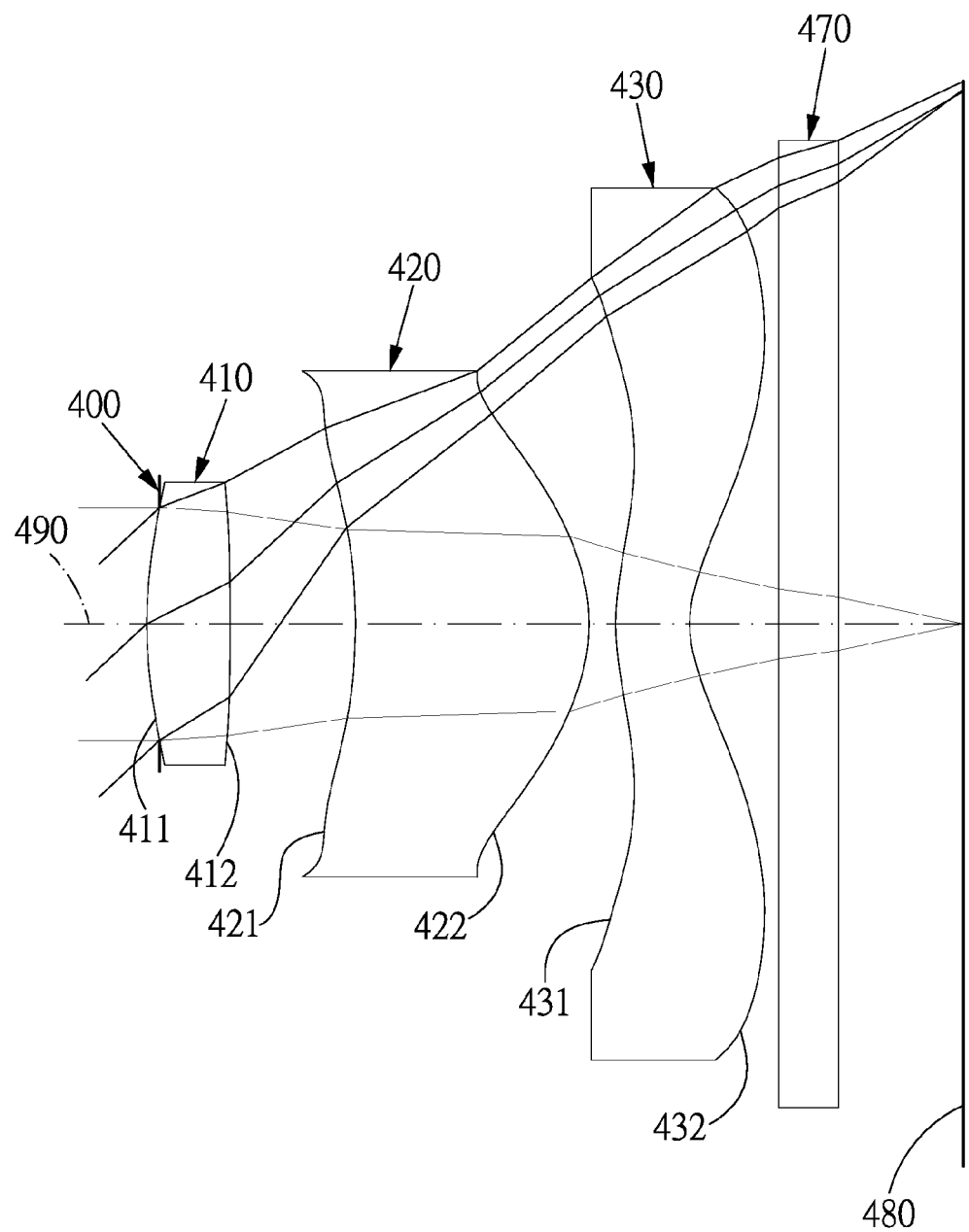
FIG. 4A shows an optical imaging lens in accordance with a fourth embodiment of the present invention.
Figure 4B:
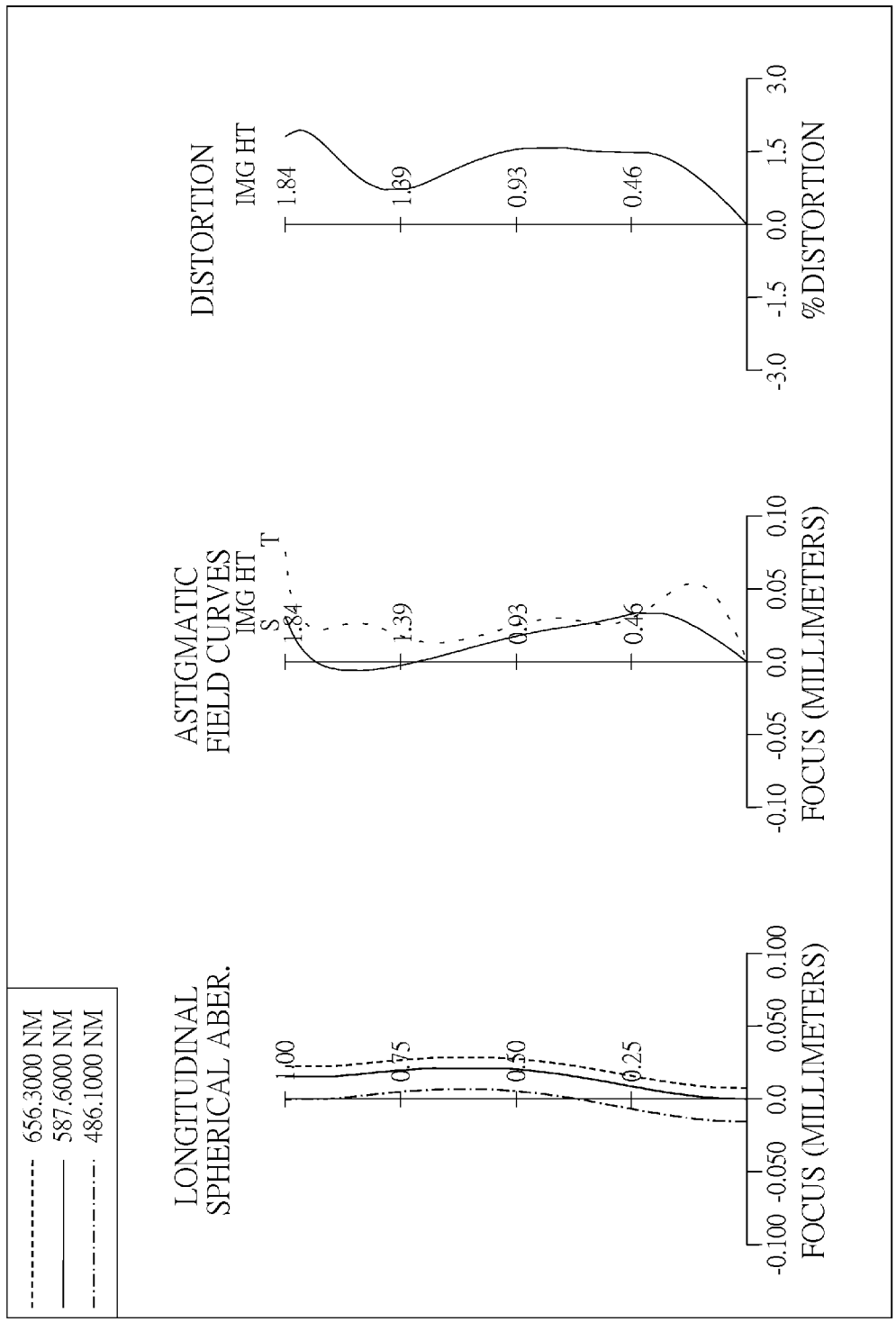
FIG. 4B shows the longitudinal spherical aberration curve, the astigmatic field curve and the distortion curve of the fourth embodiment of the present invention.

FIG. 4A shows an optical imaging lens in accordance with a fourth embodiment of the present invention, and FIG. 4B shows, in order from left to right, the longitudinal spherical aberration curves, the astigmatic field curves, and the distortion curve of the fourth embodiment of the present invention. An optical imaging lens in accordance with the fourth embodiment of the present invention comprises an aperture stop 400 and an optical assembly. The optical assembly comprises, in order from an object side to an image side: a first lens element 410, a second lens element 420, a third lens element 430, an IR cut filter 470 and an image plane 480, wherein the optical imaging lens has a total of three lens elements with refractive power. The aperture stop 400 is located between an image-side surface 412 of the first lens element 410 and an object to be photographed.

The first lens element 410 with a positive refractive power has an object-side surface 411 being convex near an optical axis 490 and the image-side surface 412 being convex near the optical axis 490, both the object-side and image-side surfaces 411, 412 are aspheric, and the first lens element 410 is made of plastic material.

The second lens element 420 with a positive refractive power has an object-side surface 421 being concave near the optical axis 490 and an image-side surface 422 being convex near the optical axis 490, both the object-side and image-side surfaces 421, 422 are aspheric, and the second lens element 420 is made of plastic material.

The third lens element 430 with a negative refractive power has an object-side surface 431 being convex near the optical axis 490 and an image-side surface 432 being concave near the optical axis 490, both the object-side and image-side surfaces 431, 432 are aspheric, the third lens element 430 is made of plastic material, and more than one inflection point is formed on the object-side surface 431 and the image-side surface 432 of the third lens element 430.

The IR cut filter 470 made of glass is located between the third lens element 430 and the image plane 480 and has no influence on the focal length of the optical imaging lens.

The detailed optical data of the fourth embodiment is shown in Table 7 and the aspheric surface data is shown in Table 8 below.

TABLE 7

(Embodiment 4)
f (focal length) = 1.942 mm, Fno = 2.4, HFOV = 43.00 deg.

| Surface | | Curvature Radius | Thickness | Material | index | Abbe # | Focal length |
|---|---|---|---|---|---|---|---|
| 0 | Object | Plane | Infinity | | | | |
| 1 (Aperture stop) | Lens 1 | 1.68 (ASP) | 0.29 | Plastic | 1.535 | 55.7 | 2.81 |
| 2 | | −12.75 (ASP) | 0.44 | | | | |
| 3 | Lens 2 | −1.89 (ASP) | 0.82 | Plastic | 1.535 | 55.7 | 1.49 |
| 4 | | −0.64 (ASP) | 0.09 | | | | |
| 5 | Lens 3 | 0.88 (ASP) | 0.26 | Plastic | 1.642 | 22.0 | −1.69 |
| 6 | | 0.43 (ASP) | 0.31 | | | | |
| 7 | IR-filter | Plane | 0.21 | Glass | 1.517 | 64.2 | |
| 8 | | Plane | 0.44 | | | | |
| 9 | Image | Plane | 0 | | | | |

Note:
Reference wavelength is 587.6 nm.

TABLE 8

Aspheric Coefficients

| | Surface # | | |
|---|---|---|---|
| | 1 | 2 | 3 |
| K = | −2.0000E+01 | 7.9942E+00 | −1.8370E+01 |
| A4 = | 4.0567E−01 | −1.1653E−01 | −2.3907E−01 |
| A6 = | −1.7927E+00 | −2.9215E−01 | −7.6540E−01 |
| A8 = | 5.2142E+00 | 1.4977E+00 | 3.8710E+00 |
| A10 = | −1.0146E+01 | −4.1720E+00 | −2.9424E+00 |
| A12 = | −1.0350E−01 | 2.0790E+00 | −6.1966E−01 |
| A14 = | 4.9528E−01 | 0.0000E+00 | 1.7427E−09 |

| | Surface # | | |
|---|---|---|---|
| | 4 | 5 | 6 |
| K = | −2.9288E+00 | −1.3730E+01 | −3.9077E+00 |
| A4 = | −4.5525E−01 | −4.2320E−01 | −4.2963E−01 |
| A6 = | 1.0520E+00 | 8.8882E−02 | 4.5559E−01 |
| A8 = | −2.3165E+00 | 3.2817E−01 | −3.4370E−01 |
| A10 = | 2.6936E+00 | −3.8323E−01 | 1.5694E−01 |
| A12 = | 2.8274E−02 | 2.0680E−01 | −3.6555E−02 |
| A14 = | −8.7830E−01 | −4.8958E−02 | 2.9144E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| Embodiment 4 | | | |
|---|---|---|---|
| Fno | 2.40 | (T12 + CT2)/TD | 0.66 |
| FOV | 86.00 | f2/f | 0.77 |
| (R1 + R2)/(R1 − R2) | −1.30 | f/R2 | −0.15 |
| CT2/CT3 | 3.16 | N2 | 1.535 |
| (R3 + R4)/(R3 − R4) | 2.03 | N3 | 1.642 |
| R6/f | 0.22 | SD/TD | 1.00 |
| CT2/T12 | 1.86 | (R5 + R6)/(R5 − R6) | 2.90 |
| V2 − V3 | 33.70 | |SAG_22/TD| | 0.21 |
| |V1 − V2| | 0.00 | R1/f | 0.87 |

Figure 5A:
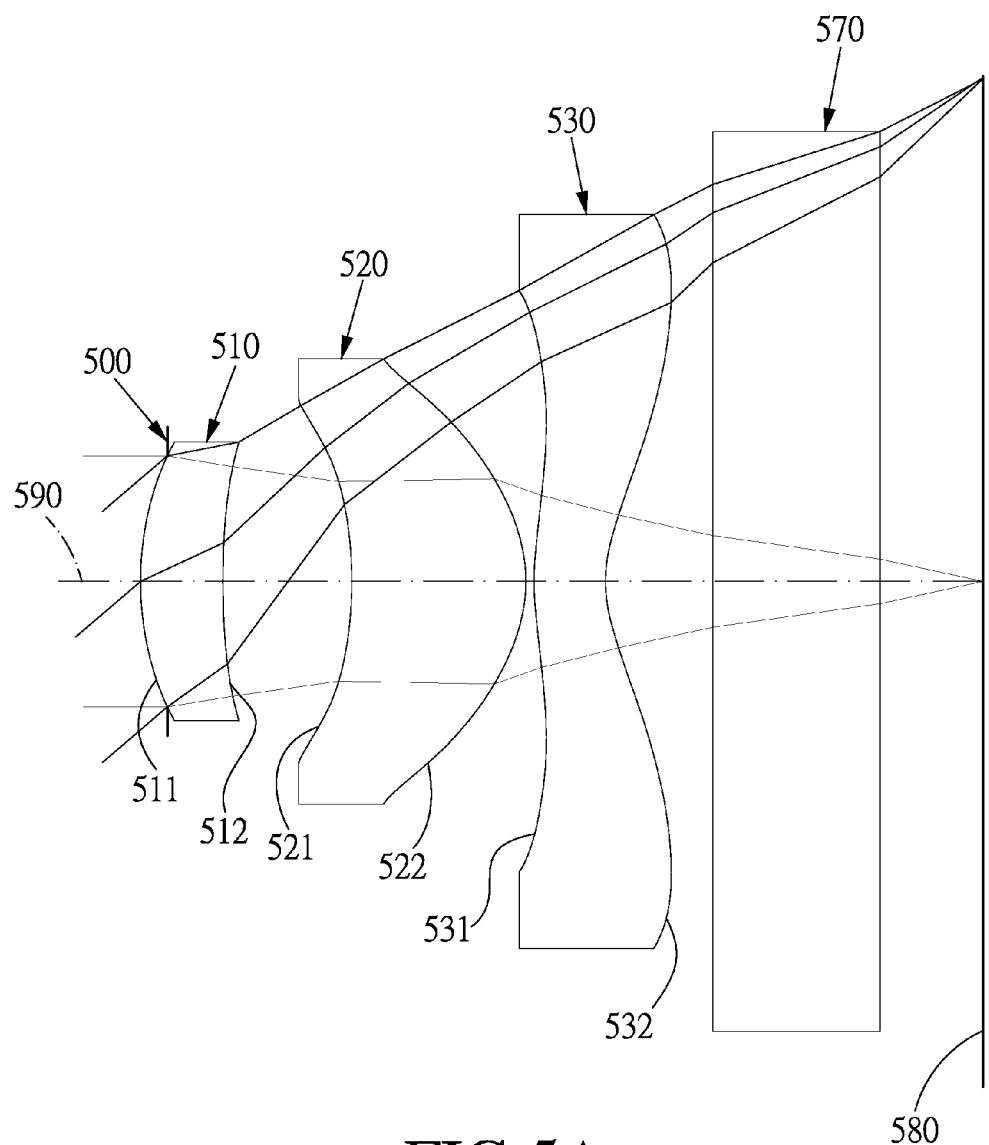
FIG. 5A shows an optical imaging lens in accordance with a fifth embodiment of the present invention.
Figure 5B:
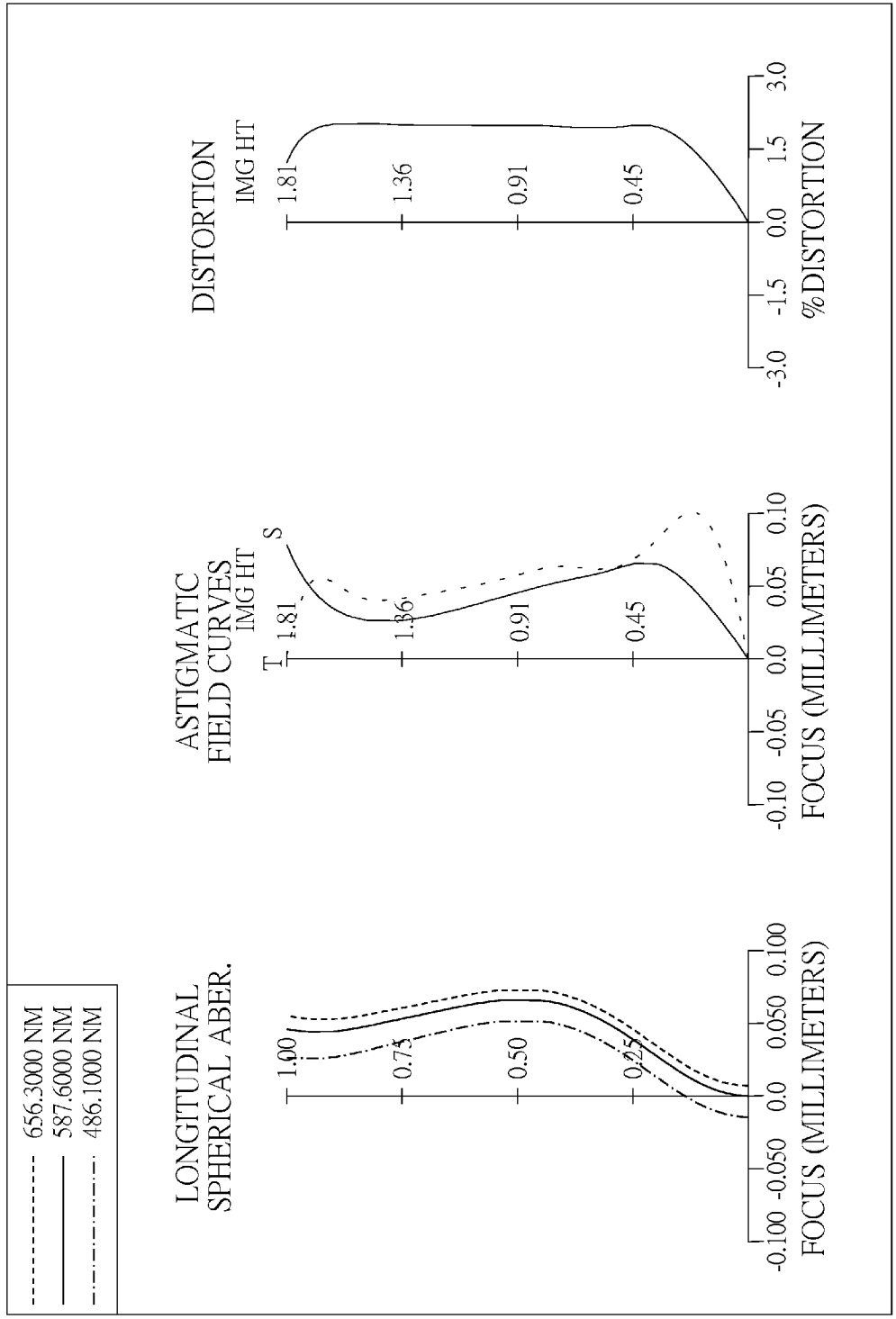
FIG. 5B shows the longitudinal spherical aberration curve, the astigmatic field curve and the distortion curve of the fifth embodiment of the present invention.

FIG. 5A shows an optical imaging lens in accordance with a fifth embodiment of the present invention, and FIG. 5B shows, in order from left to right, the longitudinal spherical aberration curves, the astigmatic field curves, and the distortion curve of the fifth embodiment of the present invention. An optical imaging lens in accordance with the fifth embodiment of the present invention comprises an aperture stop 500 and an optical assembly. The optical assembly comprises, in order from an object side to an image side: a first lens element 510, a second lens element 520, a third lens element 530, an IR cut filter 570 and an image plane 580, wherein the optical imaging lens has a total of three lens elements with refractive power. The aperture stop 500 is located between an image-side surface 512 of the first lens element 510 and an object to be photographed.

The first lens element 510 with a positive refractive power has an object-side surface 511 being convex near an optical axis 590 and an image-side surface 512 being concave near the optical axis 590, both the object-side and image-side surfaces 511, 512 are aspheric, and the first lens element 510 is made of plastic material.

The second lens element 520 with a positive refractive power has an object-side surface 521 being concave near the optical axis 590 and an image-side surface 522 being convex near the optical axis 590, both the object-side and image-side surfaces 521, 522 are aspheric, and the second lens element 520 is made of plastic material.

The third lens element 530 with a negative refractive power has an object-side surface 531 being convex near the optical axis 590 and an image-side surface 532 being concave near the optical axis 590, both the object-side and image-side surfaces 531, 532 are aspheric, the third lens element 530 is made of plastic material, and more than one inflection point is formed on the object-side surface 531 and the image-side surface 532 of the third lens element 530.

The IR cut filter 570 made of glass is located between the third lens element 530 and the image plane 580 and has no influence on the focal length of the optical imaging lens.

The detailed optical data of the fifth embodiment is shown in Table 9 and the aspheric surface data is shown in Table 10 below.

TABLE 9

(Embodiment 5)
f (focal length) = 2.08 mm, Fno = 2.3, HFOV = 40.28 deg.

| Surface | | Curvature Radius | Thickness | Material | Abbe index | Focal # | length |
|---|---|---|---|---|---|---|---|
| 0 | Object | Plane | Infinity | | | | |
| 1 (Aperture stop) | Lens 1 | 1.14 (ASP) | 0.30 | Plastic | 1.544 | 55.9 | 3.27 |
| 2 | | 2.87 (ASP) | 0.47 | | | | |
| 3 | Lens 2 | −1.51 (ASP) | 0.63 | Plastic | 1.544 | 55.9 | 1.30 |
| 4 | | −0.55 (ASP) | 0.03 | | | | |
| 5 | Lens 3 | 1.12 (ASP) | 0.26 | Plastic | 1.607 | 26.6 | −1.62 |
| 6 | | 0.48 (ASP) | 0.39 | | | | |
| 7 | IR-filter | Plane | 0.61 | Glass | 1.517 | 64.2 | |
| 8 | | Plane | 0.38 | | | | |
| 9 | Image | Plane | 0 | | | | |

Note:
Reference wavelength is 587.6 nm.

TABLE 10

Aspheric Coefficients

| | Surface # | | |
|---|---|---|---|
| | 1 | 2 | 3 |
| K = | −1.2022E+01 | −8.7834E−01 | 3.6952E+00 |
| A4 = | 1.0450E+00 | 1.3320E−01 | −1.6742E−02 |
| A6 = | −2.8216E+00 | 1.4431E−01 | −8.2335E−01 |
| A8 = | 7.4964E+00 | 1.0575E+00 | 2.3247E−01 |
| A10 = | −7.5497E+00 | −3.5166E+00 | 1.2525E+00 |
| A12 = | 1.2924E+01 | 1.5982E+01 | 9.3352E+00 |
| A14 = | −1.1048E+00 | −1.7206E+01 | 2.1209E−01 |
| A16 = | 0.0000E+00 | 0.0000E+00 | 0.0000E+00 |

| | Surface # | | |
|---|---|---|---|
| | 4 | 5 | 6 |
| K = | −7.7969E−01 | −3.7196E+01 | −5.5876E+00 |
| A4 = | 8.1977E−01 | −2.3760E−01 | −2.7575E−01 |
| A6 = | −1.6691E+00 | −5.7941E−02 | 2.5050E−01 |
| A8 = | 1.6244E+00 | 2.7670E−01 | −1.6329E−01 |

TABLE 10-continued

Aspheric Coefficients

| A10 = | −1.0628E−01 | −1.0192E−01 | 7.0177E−02 |
| A12 = | −2.4489E+00 | −6.9813E−02 | −1.8508E−02 |
| A14 = | 3.6811E+00 | 2.2931E−02 | 7.7313E−04 |
| A16 = | 0.0000E+00 | 0.0000E+00 | 2.9687E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

Embodiment 5

| Fno | 2.30 | (T12 + CT2)/TD | 0.65 |
| FOV | 80.56 | f2/f | 0.62 |
| (R1 + R2)/(R1 − R2) | −0.43 | f/R2 | 0.73 |
| CT2/CT3 | 2.44 | N2 | 1.544 |
| (R3 + R4)/(R3 − R4) | 2.15 | N3 | 1.607 |
| R6/f | 0.23 | SD/TD | 1.00 |
| CT2/T12 | 1.35 | (R5 + R6)/(R5 − R6) | 2.49 |
| V2 − V3 | 29.30 | | SAG_22/TD | | 0.31 |
| | V1 − V2 | | 0.00 | R1/f | 0.55 |

Figure 6A:
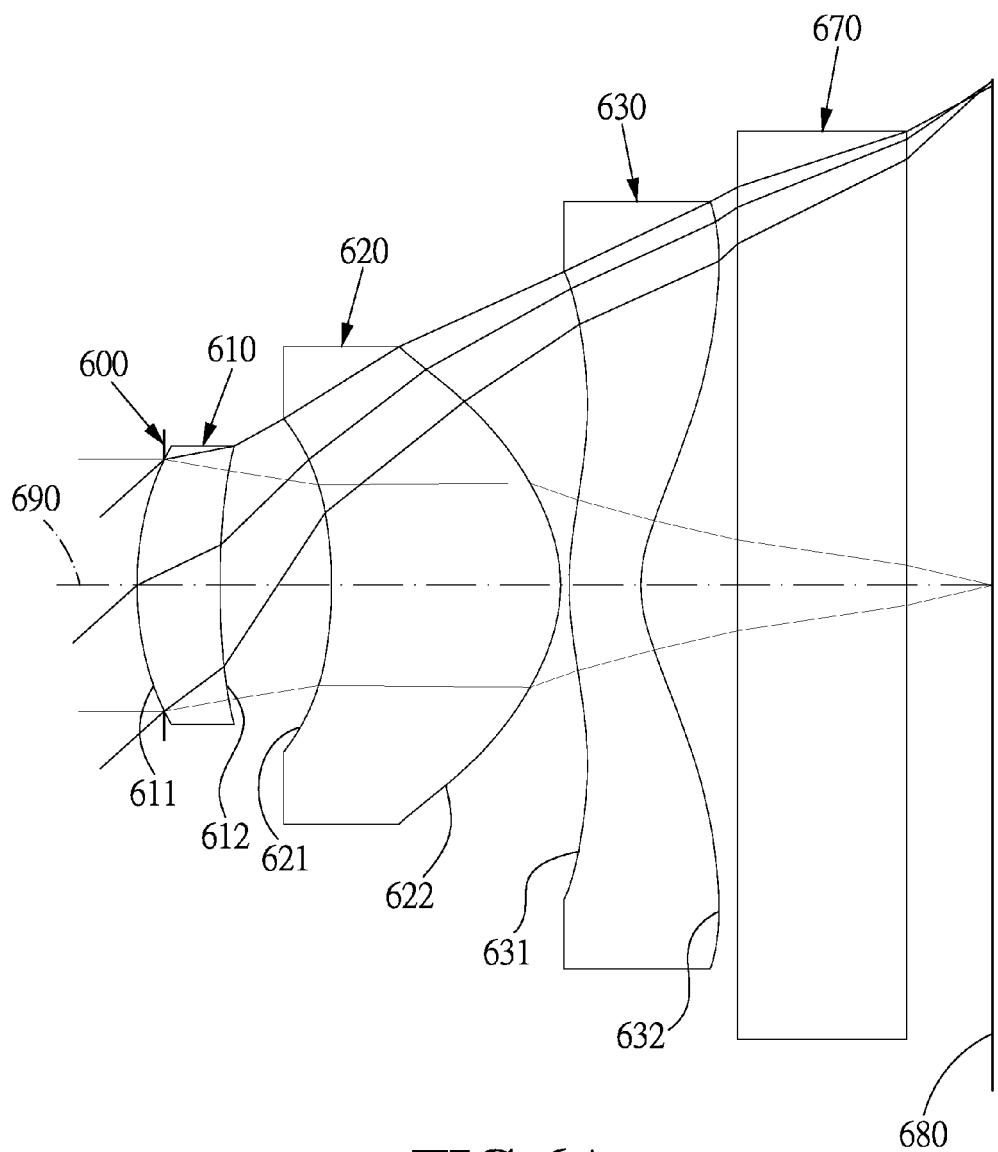
FIG. 6A shows an optical imaging lens in accordance with a sixth embodiment of the present invention.
Figure 6B:
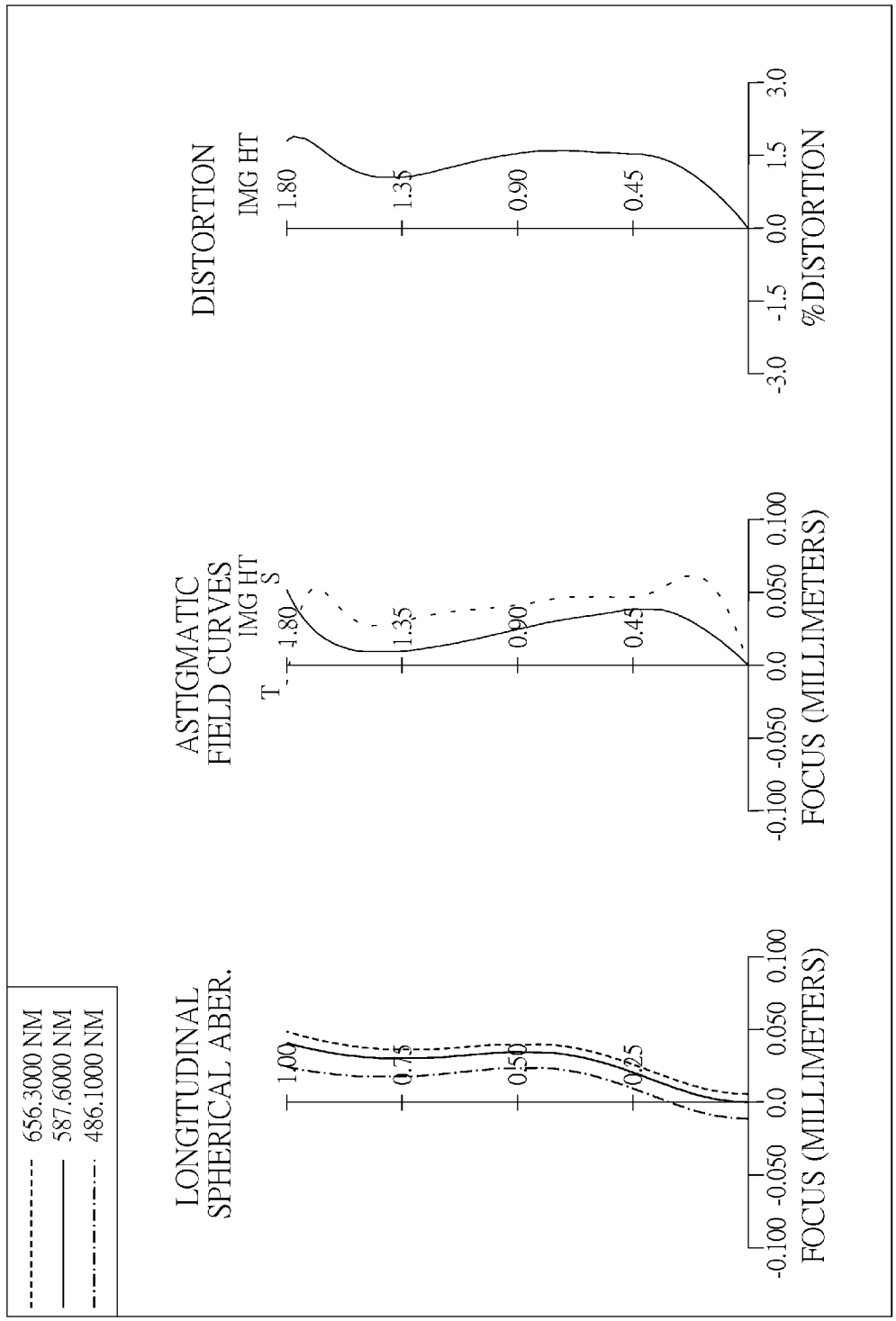
FIG. 6B shows the longitudinal spherical aberration curve, the astigmatic field curve and the distortion curve of the sixth embodiment of the present invention.

FIG. 6A shows an optical imaging lens in accordance with a sixth embodiment of the present invention, and FIG. 6B shows, in order from left to right, the longitudinal spherical aberration curves, the astigmatic field curves, and the distortion curve of the sixth embodiment of the present invention. An optical imaging lens in accordance with the sixth embodiment of the present invention comprises an aperture stop 600 and an optical assembly. The optical assembly comprises, in order from an object side to an image side: a first lens element 610, a second lens element 620, a third lens element 630, an IR cut filter 670 and an image plane 680, wherein the optical imaging lens has a total of three lens elements with refractive power. The aperture stop 600 is located between an image-side surface 612 of the first lens element 610 and an object to be photographed.

The first lens element 610 with a positive refractive power has an object-side surface 611 being convex near an optical axis 690 and the image-side surface 612 being concave near the optical axis 690, both the object-side and image-side surfaces 611, 612 are aspheric, and the first lens element 610 is made of plastic material.

The second lens element 620 with a positive refractive power has an object-side surface 621 being concave near the optical axis 690 and an image-side surface 622 being convex near the optical axis 690, both the object-side and image-side surfaces 621, 622 are aspheric, and the second lens element 620 is made of plastic material.

The third lens element 630 with a negative refractive power has an object-side surface 631 being convex near the optical axis 690 and an image-side surface 632 being concave near the optical axis 690, both the object-side and image-side surfaces 631, 632 are aspheric, the third lens element 630 is made of plastic material, and more than one inflection point is formed on the object-side surface 631 and the image-side surface 632 of the third lens element 630.

The IR cut filter 670 made of glass is located between the third lens element 630 and the image plane 680 and has no influence on the focal length of the optical imaging lens.

The detailed optical data of the sixth embodiment is shown in Table 11 and the aspheric surface data is shown in Table 12 below.

TABLE 11

(Embodiment 6)
f (focal length) = 1.976 mm, Fno = 2.2, HFOV = 41.5 deg.

| Surface | | Curvature Radius | Thickness | Material | index | Abbe # | Focal length |
|---|---|---|---|---|---|---|---|
| 0 | Object | Plane | Infinity | | | | |
| 1 (Aperture stop) | Lens 1 | 1.13 (ASP) | 0.30 | Plastic | 1.544 | 55.9 | 3.04 |
| 2 | | 3.22 (ASP) | 0.40 | | | | |
| 3 | Lens 2 | −1.56 (ASP) | 0.83 | Plastic | 1.544 | 55.9 | 1.24 |
| 4 | | −0.56 (ASP) | 0.03 | | | | |
| 5 | Lens 3 | 1.01 (ASP) | 0.26 | Plastic | 1.642 | 22.0 | −1.59 |
| 6 | | 0.46 (ASP) | 0.35 | | | | |
| 7 | IR-filter | Plane | 0.61 | Glass | 1.517 | 64.2 | |
| 8 | | Plane | 0.31 | | | | |
| 9 | Image | Plane | 0 | | | | |

Note:
Reference wavelength is 587.6 nm.

TABLE 12

Aspheric Coefficients

| | Surface # | | |
|---|---|---|---|
| | 1 | 2 | 3 |
| K = | −1.0905E+01 | 1.5108E+01 | −8.2784E−01 |
| A4 = | 9.9570E−01 | 7.7477E−02 | −1.7217E−01 |
| A6 = | −2.2983E+00 | −4.3942E−02 | −1.6004E+00 |
| A8 = | 6.0966E+00 | 2.2304E+00 | 2.0503E+00 |
| A10 = | −6.5364E+00 | −6.8565E+00 | −9.6883E−01 |
| A12 = | 1.8006E+00 | 1.5178E+01 | 4.2265E+00 |
| A14 = | 2.8817E−02 | −6.3460E+00 | −1.3111E+00 |
| A16 = | 0.0000E+00 | 0.0000E+00 | 0.0000E+00 |

| | Surface # | | |
|---|---|---|---|
| | 4 | 5 | 6 |
| K = | −7.9302E−01 | −2.1839E+01 | −4.7611E+00 |
| A4 = | 8.3617E−01 | −1.6896E−01 | −2.5752E−01 |
| A6 = | −1.5997E+00 | −2.0626E−01 | 2.0412E−01 |
| A8 = | 1.3744E+00 | 4.0391E−01 | −1.3181E−01 |
| A10 = | 4.8172E−01 | −2.0110E−01 | 6.9668E−02 |
| A12 = | −2.3158E+00 | 2.0472E−02 | −2.2831E−02 |
| A14 = | 1.9534E+00 | −2.1246E−04 | 2.6590E−03 |
| A16 = | 0.0000E+00 | 0.0000E+00 | 3.3931E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| Embodiment 6 | | | |
|---|---|---|---|
| Fno | 2.20 | (T12 + CT2)/TD | 0.68 |
| FOV | 83.00 | f2/f | 0.63 |
| (R1 + R2)/(R1 − R2) | −0.48 | f/R2 | 0.61 |
| CT2/CT3 | 3.18 | N2 | 1.544 |
| (R3 + R4)/(R3 − R4) | 2.11 | N3 | 1.642 |
| R6/f | 0.23 | SD/TD | 1.00 |
| CT2/T12 | 2.06 | (R5 + R6)/(R5 − R6) | 2.65 |
| V2 − V3 | 33.90 | \| SAG_22/TD \| | 0.32 |
| \| V1 − V2 \| | 0.00 | R1/f | 0.57 |

Figure 7A:
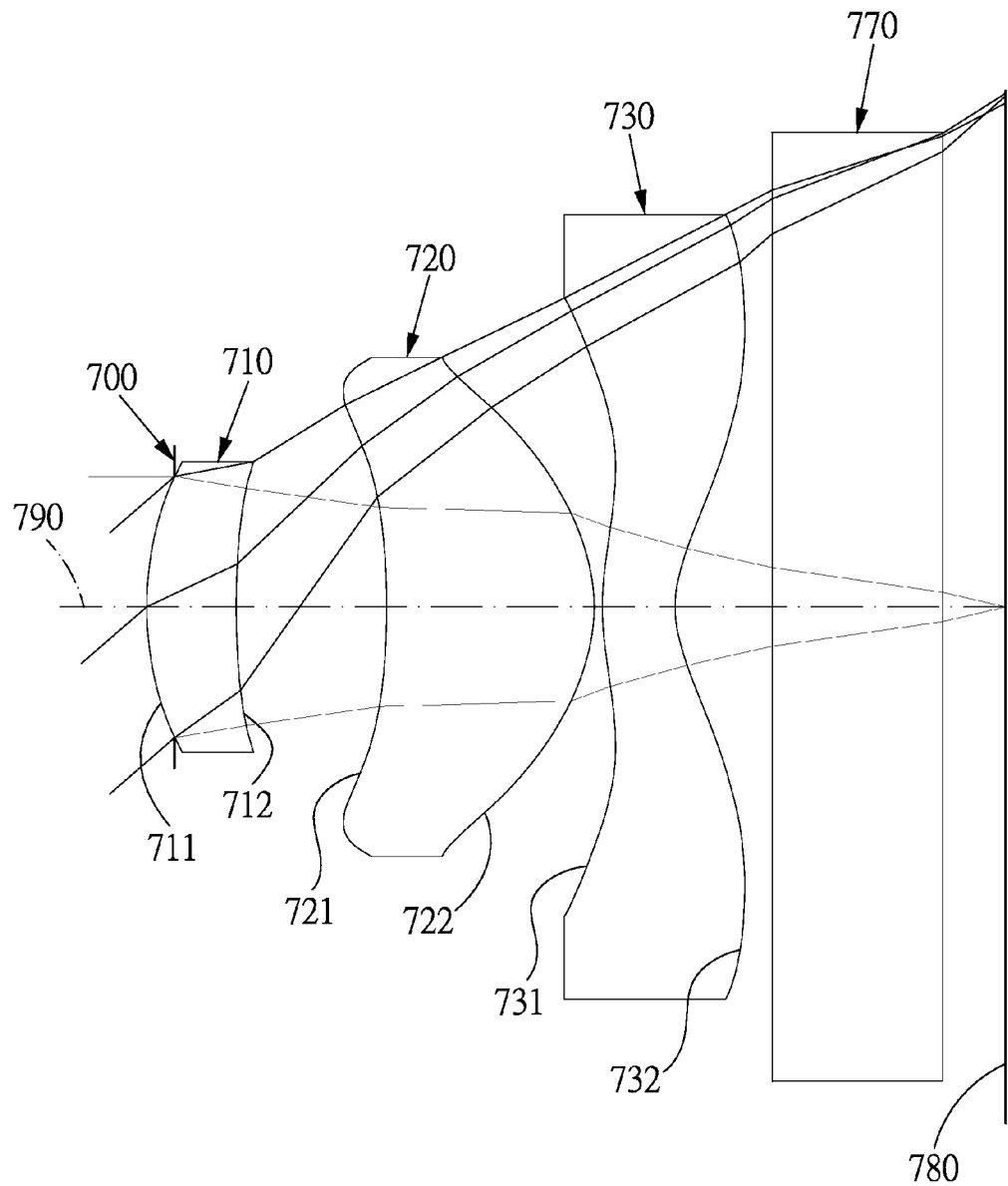
FIG. 7A shows an optical imaging lens in accordance with a seventh embodiment of the present invention.
Figure 7B:
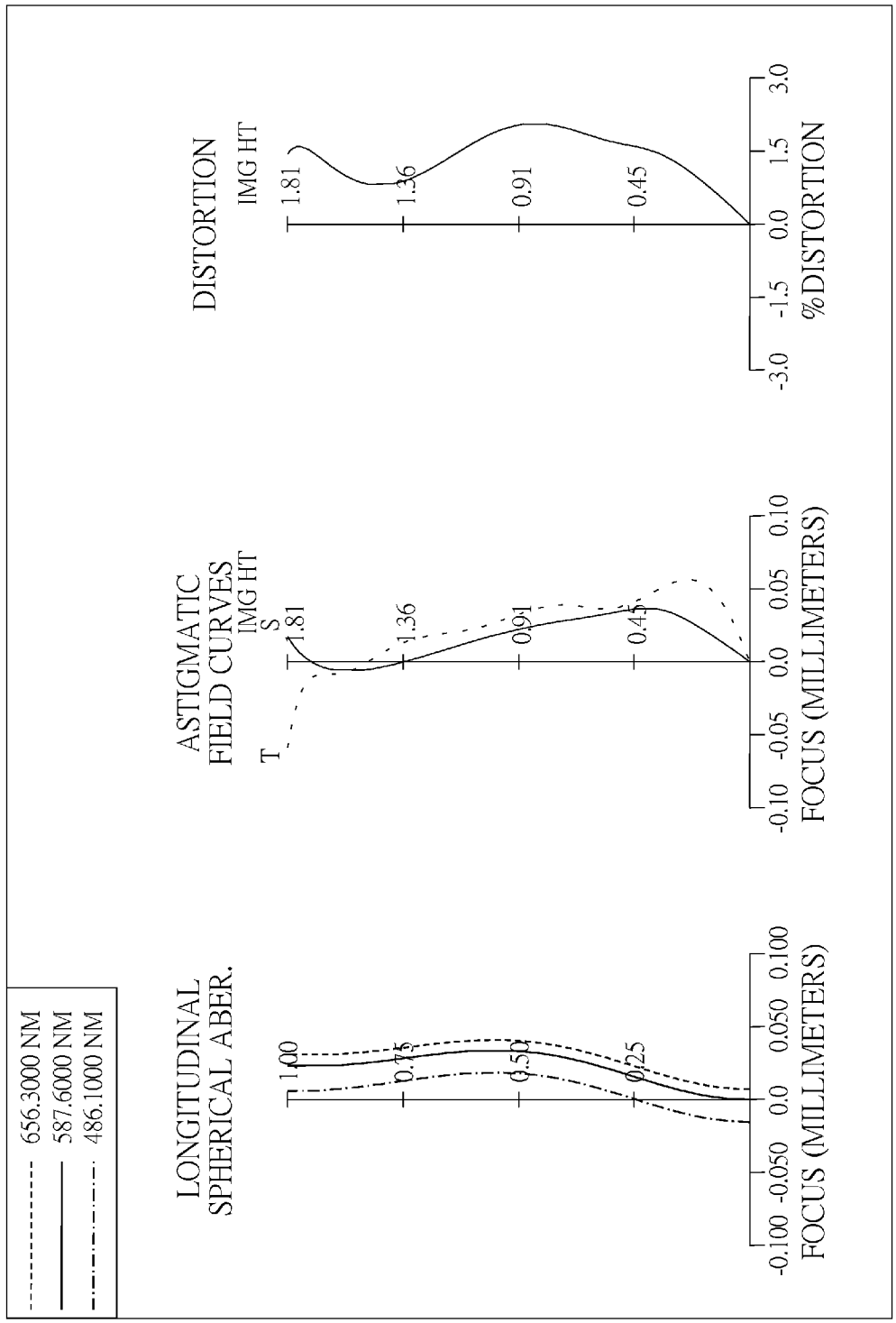
FIG. 7B shows the longitudinal spherical aberration curve, the astigmatic field curve and the distortion curve of the seventh embodiment of the present invention.

FIG. 7A shows an optical imaging lens in accordance with a seventh embodiment of the present invention, and FIG. 7B shows, in order from left to right, the longitudinal spherical aberration curves, the astigmatic field curves, and the distortion curve of the seventh embodiment of the present invention. An optical imaging lens in accordance with the seventh embodiment of the present invention comprises an aperture stop 700 and an optical assembly. The optical assembly comprises, in order from an object side to an image side: a first lens element 710, a second lens element 720, a third lens element 730, an IR cut filter 770 and an image plane 780, wherein the optical imaging lens has a total of three lens elements with refractive power. The aperture stop 700 is located between an image-side surface 712 of the first lens element 710 and an object to be photographed.

The first lens element 710 with a positive refractive power has an object-side surface 711 being convex near an optical axis 790 and the image-side surface 712 being concave near the optical axis 790, both the object-side and image-side surfaces 711, 712 are aspheric, and the first lens element 710 is made of plastic material.

The second lens element 720 with a positive refractive power has an object-side surface 721 being concave near the optical axis 790 and an image-side surface 722 being convex near the optical axis 790, both the object-side and image-side surfaces 721, 722 are aspheric, and the second lens element 720 is made of plastic material.

The third lens element 730 with a negative refractive power has an object-side surface 731 being convex near the optical axis 790 and an image-side surface 732 being concave near the optical axis 790, both the object-side and image-side surfaces 731, 732 are aspheric, the third lens element 730 is made of plastic material, and more than one inflection point is formed on the object-side surface 731 and the image-side surface 732 of the third lens element 730.

The IR cut filter 770 made of glass is located between the third lens element 730 and the image plane 780 and has no influence on the focal length of the optical imaging lens.

The detailed optical data of the seventh embodiment is shown in Table 13 and the aspheric surface data is shown in Table 14 below.

TABLE 13

(Embodiment 7)
f (focal length) = 2.076 mm, Fno = 2.25, HFOV = 40.57 deg.

| Surface | | Curvature Radius | Thickness | Material | index | Abbe # | Focal length |
|---|---|---|---|---|---|---|---|
| 0 | Object | Plane | Infinity | | | | |
| 1 | Lens 1 | 1.17 (ASP) | 0.32 | Plastic | 1.544 | 55.9 | 3.25 |
| (Aperture stop) | | | | | | | |
| 2 | | 3.10 (ASP) | 0.54 | | | | |

TABLE 13-continued (Embodiment 7)
f (focal length) = 2.076 mm, Fno = 2.25, HFOV = 40.57 deg.

| Surface | | Curvature Radius | Thickness | Material | index | Abbe # | Focal length |
|---|---|---|---|---|---|---|---|
| 3 | Lens 2 | −2.55 (ASP) | 0.74 | Plastic | 1.544 | 55.9 | 1.32 |
| 4 | | −0.62 (ASP) | 0.03 | | | | |
| 5 | Lens 3 | 0.98 (ASP) | 0.26 | Plastic | 1.607 | 26.6 | −1.52 |
| 6 | | 0.43 (ASP) | 0.35 | | | | |
| 7 | IR-filter | Plane | 0.61 | Glass | 1.517 | 64.2 | |
| 8 | | Plane | 0.23 | | | | |
| 9 | Image | Plane | 0 | | | | |

Note:
Reference wavelength is 587.6 nm.

TABLE 14

Aspheric Coefficients

| | Surface # | | |
|---|---|---|---|
| | 1 | 2 | 3 |
| K = | −7.2246E+00 | 1.3686E+01 | −4.3706E+00 |
| A4 = | 6.2149E−01 | 1.0947E−01 | −3.7852E−02 |
| A6 = | −6.9337E−01 | 6.5161E−02 | −1.0806E+00 |
| A8 = | 1.5010E+00 | 1.1373E+00 | 1.0263E+00 |
| A10 = | −9.2294E−01 | −1.0081E+00 | 7.0516E−01 |
| A12 = | −3.9600E−02 | 7.9561E−01 | 7.0256E−01 |
| A14 = | 1.5917E−01 | −6.8065E−06 | −6.5012E−01 |
| A16 = | 0.0000E+00 | 0.0000E+00 | 0.0000E+00 |

| | Surface # | | |
|---|---|---|---|
| | 4 | 5 | 6 |
| K = | −3.4106E+00 | −1.8079E+01 | −4.1534E+00 |
| A4 = | −5.4883E−01 | −5.2449E−01 | −4.1794E−01 |
| A6 = | 6.1699E−01 | 3.9594E−02 | 3.9702E−01 |
| A8 = | −1.1971E+00 | 4.6595E−01 | −2.6307E−01 |
| A10 = | 1.1880E+00 | −3.1272E−01 | 1.1131E−01 |
| A12 = | −6.4657E−01 | 5.0494E−02 | −2.3385E−02 |
| A14 = | 6.1851E−01 | −1.1235E−03 | 5.6122E−04 |
| A16 = | 0.0000E+00 | 0.0000E+00 | 2.3182E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| Embodiment 7 | | | |
|---|---|---|---|
| Fno | 2.25 | (T12 + CT2)/TD | 0.68 |
| FOV | 81.14 | f2/f | 0.64 |
| (R1 + R2)/(R1 − R2) | −0.45 | f/R2 | 0.67 |
| CT2/CT3 | 2.85 | N2 | 1.544 |
| (R3 + R4)/(R3 − R4) | 1.64 | N3 | 1.607 |
| R6/f | 0.21 | SD/TD | 1.00 |
| CT2/T12 | 1.38 | (R5 + R6)/(R5 − R6) | 2.55 |
| V2 − V3 | 29.30 | \| SAG_22/TD \| | 0.29 |
| \| V1 − V2 \| | 0.00 | R1/f | 0.56 |

Figure 8A:
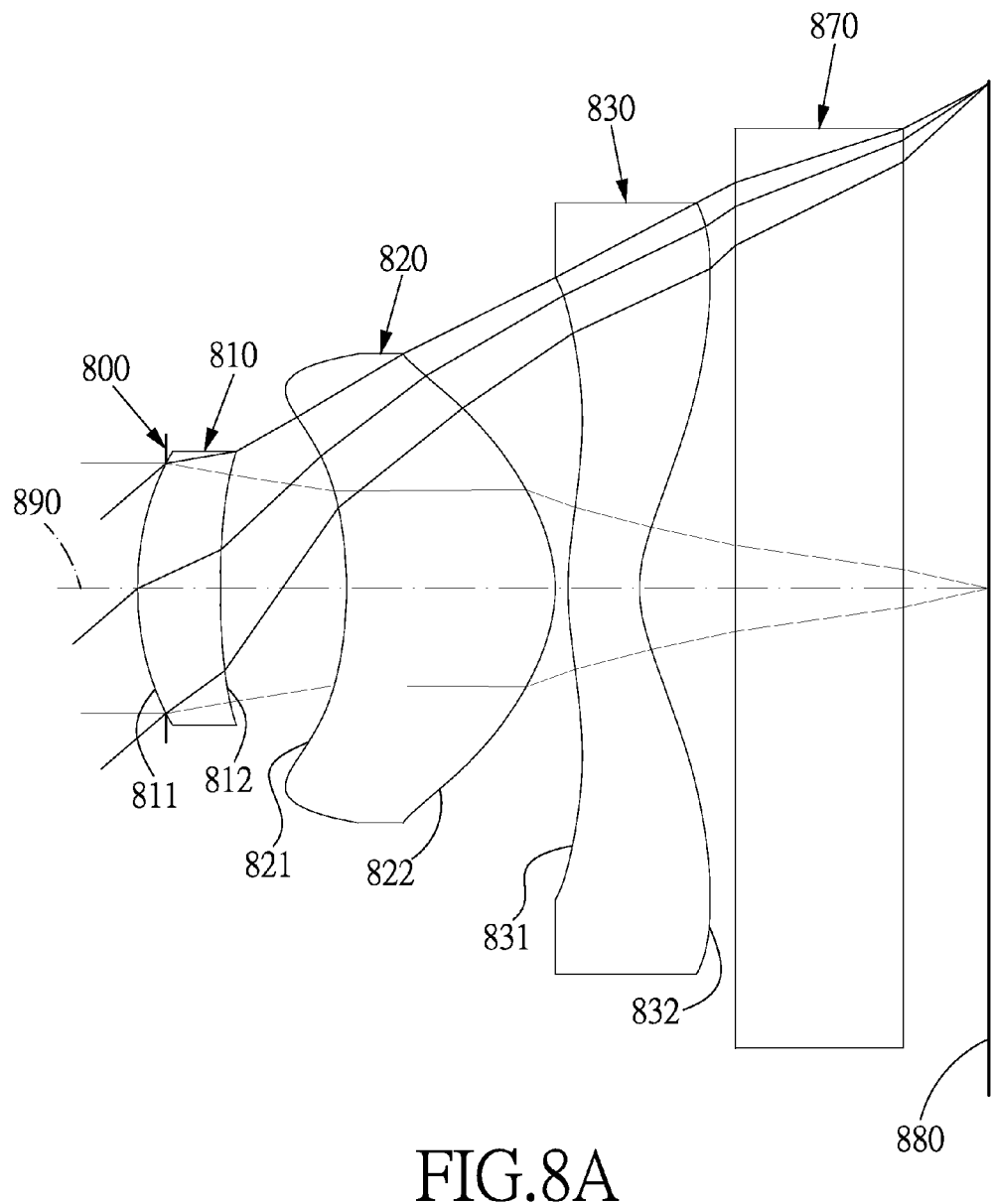
FIG. 8A shows an optical imaging lens in accordance with an eighth embodiment of the present invention.
Figure 8B:
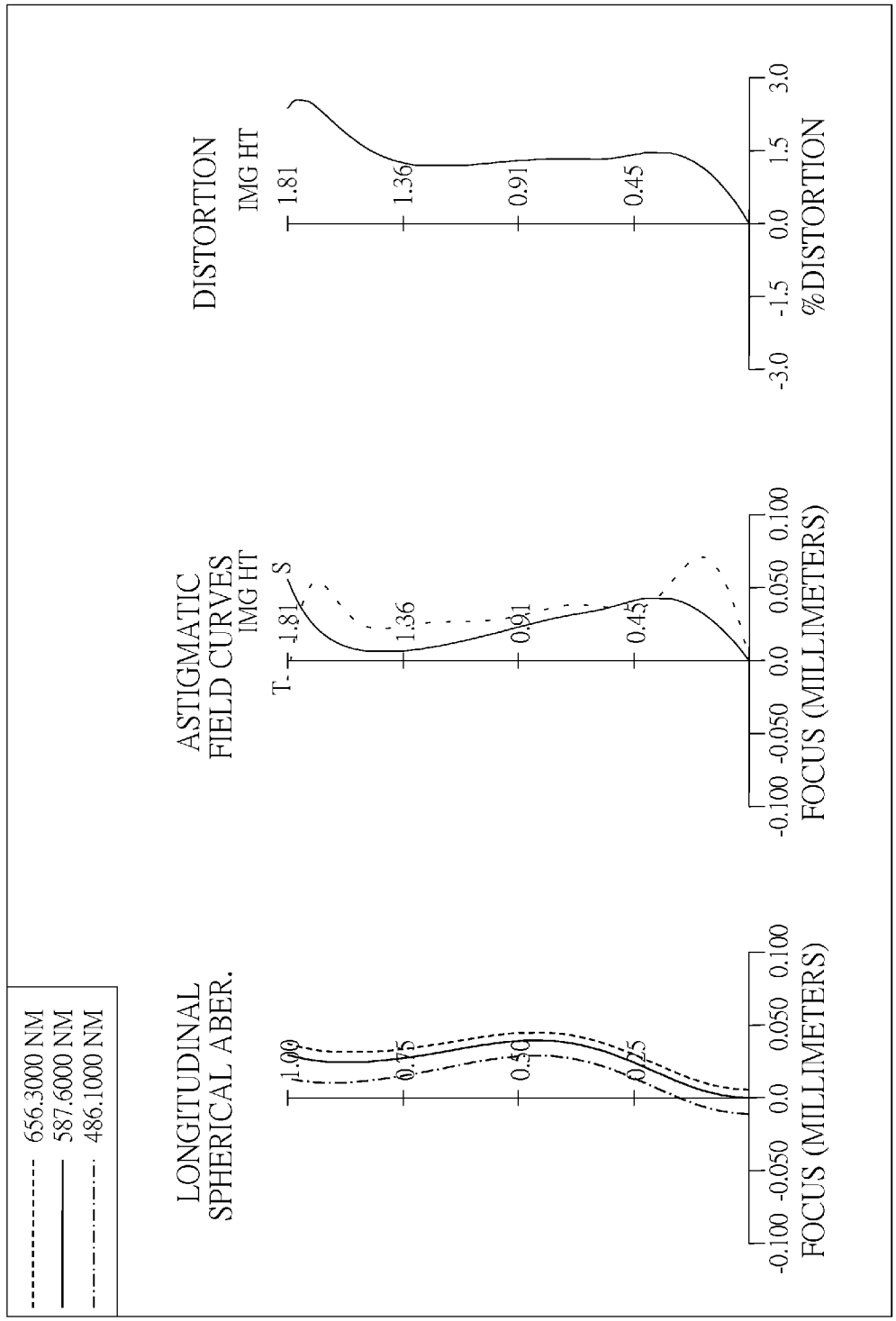
FIG. 8B shows the longitudinal spherical aberration curve, the astigmatic field curve and the distortion curve of the eighth embodiment of the present invention.

FIG. 8A shows an optical imaging lens in accordance with an eighth embodiment of the present invention, and FIG. 8B shows, in order from left to right, the longitudinal spherical aberration curves, the astigmatic field curves, and the distortion curve of the eighth embodiment of the present invention. An optical imaging lens in accordance with the eighth embodiment of the present invention comprises an aperture stop 800 and an optical assembly. The optical assembly comprises, in order from an object side to an image side: a first lens element 810, a second lens element 820, a third lens element 830, an IR cut filter 870 and an image plane 880, wherein the optical imaging lens has a total of three lens elements with refractive power. The aperture stop 800 is located between an image-side surface 812 of the first lens element 810 and an object to be photographed.

The first lens element 810 with a positive refractive power has an object-side surface 811 being convex near an optical axis 890 and the image-side surface 812 being concave near the optical axis 890, both the object-side and image-side surfaces 811, 812 are aspheric, and the first lens element 810 is made of plastic material.

The second lens element 820 with a positive refractive power has an object-side surface 821 being concave near the optical axis 890 and an image-side surface 822 being convex near the optical axis 890, both the object-side and image-side surfaces 821, 822 are aspheric, and the second lens element 820 is made of plastic material.

The third lens element 830 with a negative refractive power has an object-side surface 831 being convex near the optical axis 890 and an image-side surface 832 being concave near the optical axis 890, both the object-side and image-side surfaces 831, 832 are aspheric, the third lens element 830 is made of plastic material, and more than one inflection point is formed on the object-side surface 831 and the image-side surface 832 of the third lens element 830.

The IR cut filter 870 made of glass is located between the third lens element 830 and the image plane 880 and has no influence on the focal length of the optical imaging lens.

The detailed optical data of the eighth embodiment is shown in Table 15 and the aspheric surface data is shown in Table 16 below.

TABLE 15

(Embodiment 8)
f (focal length) = 2.07 mm, Fno = 2.3, HFOV = 40.34 deg.

| Surface | | Curvature Radius | Thickness | Material | Abbe index | Focal # length |
|---|---|---|---|---|---|---|
| 0 | Object | Plane | Infinity | | | |
| 1 (Aperture stop) | Lens 1 | 1.09 (ASP) | 0.30 | Plastic | 1.544 | 55.9 | 3.04 |
| 2 | | 2.93 (ASP) | 0.46 | | | |
| 3 | Lens 2 | −1.51 (ASP) | 0.76 | Plastic | 1.544 | 55.9 | 1.24 |
| 4 | | −0.55 (ASP) | 0.05 | | | |
| 5 | Lens 3 | 1.10 (ASP) | 0.26 | Plastic | 1.642 | 22.0 | −1.49 |
| 6 | | 0.46 (ASP) | 0.35 | | | |
| 7 | IR-filter | Plane | 0.61 | Glass | 1.517 | 64.2 |
| 8 | | Plane | 0.31 | | | |
| 9 | Image | Plane | 0 | | | |

Note:
Reference wavelength is 587.6 nm.

TABLE 16

Aspheric Coefficients

| | Surface # | | |
|---|---|---|---|
| | 1 | 2 | 3 |
| K = | −1.0299E+01 | 2.0413E+01 | −1.1924E+00 |
| A4 = | 1.0450E+00 | 6.3216E−02 | −1.4763E−01 |
| A6 = | −2.4475E+00 | −4.8348E−02 | −1.4169E+00 |
| A8 = | 6.9206E+00 | 2.1449E+00 | 1.4787E+00 |
| A10 = | −7.7849E+00 | −7.4787E+00 | −6.2605E−02 |
| A12 = | 2.1141E+00 | 1.7821E−01 | 4.9625E+00 |
| A14 = | 3.4837E−02 | −7.6717E+00 | −1.5850E+00 |
| A16 = | 0.0000E+00 | 0.0000E+00 | 0.0000E+00 |

| | Surface # | | |
|---|---|---|---|
| | 4 | 5 | 6 |
| K = | −7.9610E−01 | −3.2331E+01 | −5.2883E+00 |
| A4 = | 9.1104E−01 | −1.6838E−01 | −2.6232E−01 |
| A6 = | −1.7411E+00 | −2.1844E−01 | 2.1749E−01 |
| A8 = | 1.4634E+00 | 4.4996E−01 | −1.4623E−01 |
| A10 = | 5.9300E−01 | −2.3809E−01 | 7.9982E−02 |
| A12 = | −2.4625E+00 | 2.7655E−02 | −2.7261E−02 |
| A14 = | 2.1752E+00 | −2.5685E−04 | 3.3729E−03 |
| A16 = | 0.0000E+00 | 0.0000E+00 | 3.3379E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| Embodiment 8 | | | |
|---|---|---|---|
| Fno | 2.30 | (T12 + CT2)/TD | 0.67 |
| FOV | 80.68 | f2/f | 0.60 |
| (R1 + R2)/(R1 − R2) | −0.46 | f/R2 | 0.71 |
| CT2/CT3 | 2.91 | N2 | 1.544 |
| (R3 + R4)/(R3 − R4) | 2.14 | N3 | 1.642 |
| R6/f | 0.22 | SD/TD | 1.00 |
| CT2/T12 | 1.65 | (R5 + R6)/(R5 − R6) | 2.46 |
| V2 − V3 | 33.90 | \| SAG_22/TD \| | 0.30 |
| \| V1 − V2 \| | 0.00 | R1/f | 0.53 |

Figure 9A:
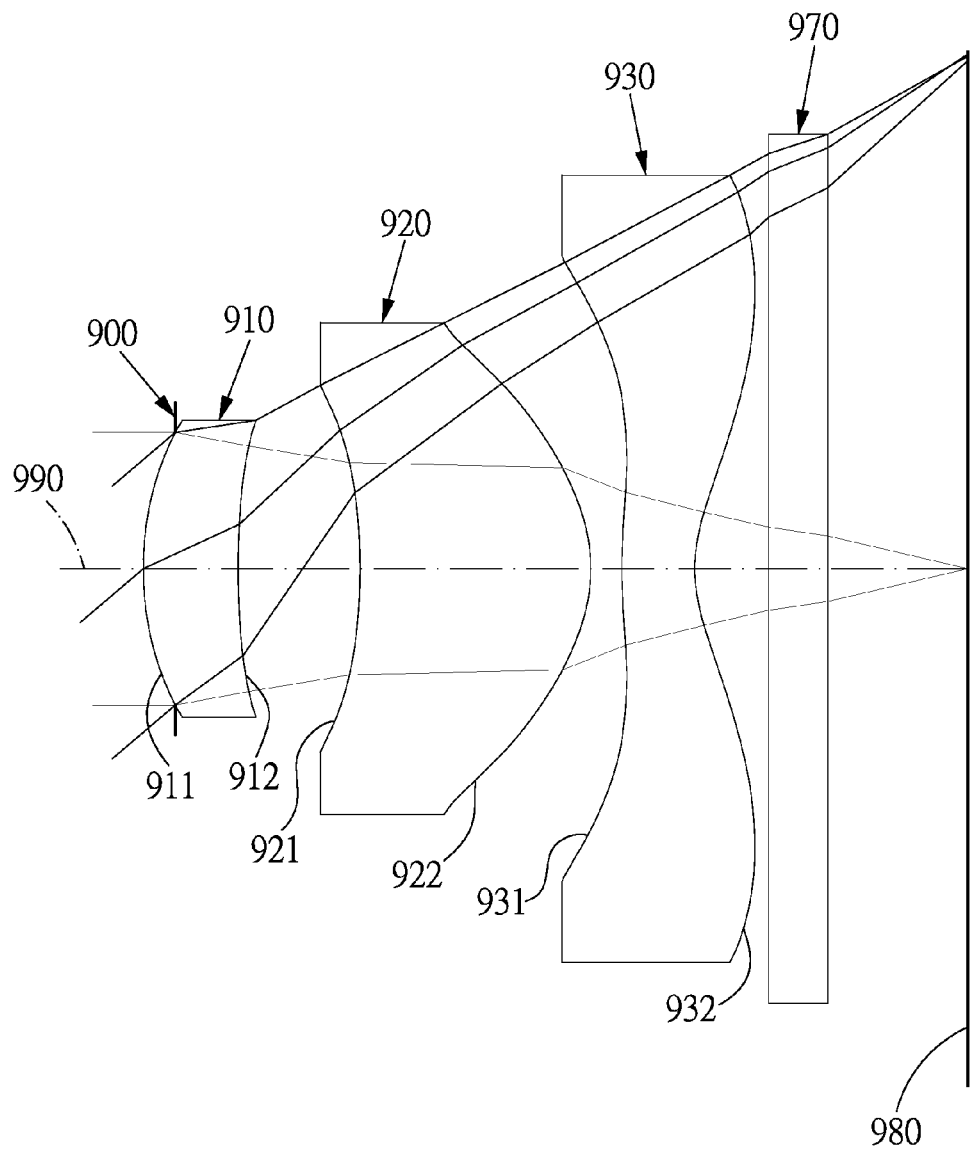
FIG. 9A shows an optical imaging lens in accordance with a ninth embodiment of the present invention.
Figure 9B:
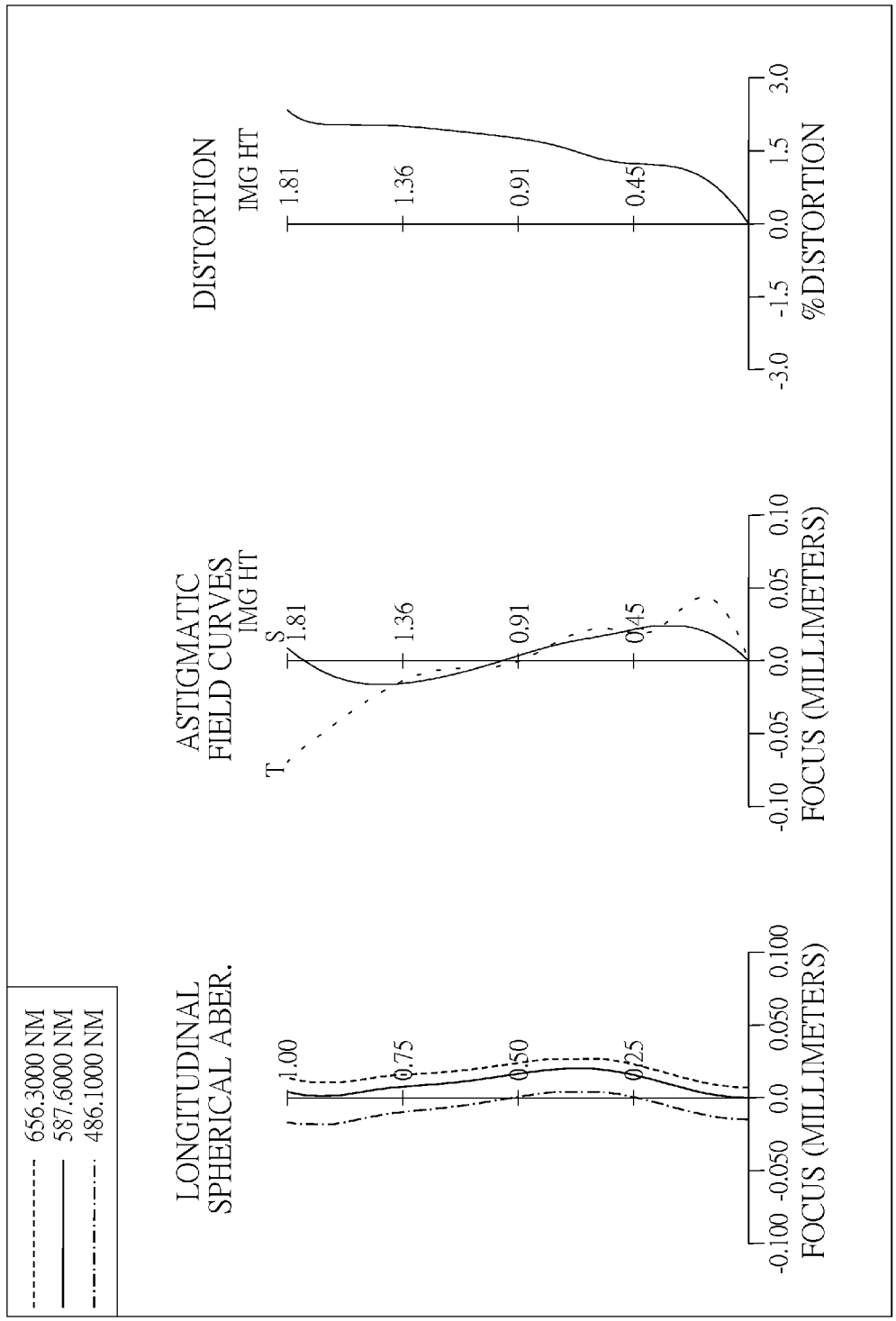
FIG. 9B shows the longitudinal spherical aberration curve, the astigmatic field curve and the distortion curve of the ninth embodiment of the present invention.

FIG. 9A shows an optical imaging lens in accordance with a ninth embodiment of the present invention, and FIG. 9B shows, in order from left to right, the longitudinal spherical aberration curves, the astigmatic field curves, and the distortion curve of the ninth embodiment of the present invention. An optical imaging lens in accordance with the ninth embodiment of the present invention comprises an aperture stop 900 and an optical assembly. The optical assembly comprises, in order from an object side to an image side: a first lens element 910, a second lens element 920, a third lens element 930, an IR cut filter 970 and an image plane 980, wherein the optical imaging lens has a total of three lens elements with refractive power. The aperture stop 900 is located between an image-side surface 912 of the first lens element 910 and an object to be photographed.

The first lens element 910 with a positive refractive power has an object-side surface 911 being convex near an optical axis 990 and the image-side surface 912 being concave near the optical axis 990, both the object-side and image-side surfaces 911, 912 are aspheric, and the first lens element 910 is made of plastic material.

The second lens element 920 with a positive refractive power has an object-side surface 921 being concave near the optical axis 990 and an image-side surface 922 being convex near the optical axis 990, both the object-side and image-side surfaces 921, 922 are aspheric, and the second lens element 920 is made of plastic material.

The third lens element 930 with a negative refractive power has an object-side surface 931 being convex near the optical axis 990 and an image-side surface 932 being concave near the optical axis 990, both the object-side and image-side surfaces 931, 932 are aspheric, the third lens element 930 is made of plastic material, and more than one inflection point is formed on the object-side surface 931 and the image-side surface 932 of the third lens element 930.

The IR cut filter 970 made of glass is located between the third lens element 930 and the image plane 980 and has no influence on the focal length of the optical imaging lens.

The detailed optical data of the ninth embodiment is shown in Table 17 and the aspheric surface data is shown in Table 18 below.

TABLE 17

(Embodiment 9)
f (focal length) = 2.114 mm, Fno = 2.2, HFOV = 39.98 deg.

| Surface | | Curvature Radius | Thickness | Material | index | Abbe # | Focal length |
|---|---|---|---|---|---|---|---|
| 0 | Object | Plane | Infinity | | | | |
| 1 (Aperture stop) | Lens 1 | 1.11 (ASP) | 0.34 | Plastic | 1.544 | 55.9 | 3.01 |
| 2 | | 3.06 (ASP) | 0.43 | | | | |
| 3 | Lens 2 | -2.15 (ASP) | 0.82 | Plastic | 1.544 | 55.9 | 1.23 |
| 4 | | -0.58 (ASP) | 0.11 | | | | |
| 5 | Lens 3 | 1.72 (ASP) | 0.26 | Plastic | 1.607 | 26.6 | -1.30 |
| 6 | | 0.51 (ASP) | 0.26 | | | | |
| 7 | IR-filter | Plane | 0.21 | Glass | 1.517 | 64.2 | |
| 8 | | Plane | 0.50 | | | | |
| 9 | Image | Plane | 0 | | | | |

Note:
Reference wavelength is 587.6 nm.

TABLE 18

Aspheric Coefficients

| | Surface # | | |
|---|---|---|---|
| | 1 | 2 | 3 |
| K = | -1.3489E+01 | -1.8187E+00 | 5.5839E+00 |
| A4 = | 1.2175E+00 | 1.4515E-01 | -3.6231E-02 |
| A6 = | -3.5108E+00 | 1.6916E-01 | -8.4549E-01 |
| A8 = | 8.5896E+00 | 1.1043E+00 | 1.1765E+00 |
| A10 = | -7.1696E+00 | -5.5617E+00 | 1.7531E-02 |
| A12 = | 1.7982E+00 | 2.2237E+01 | 1.9780E+00 |
| A14 = | -1.6323E+01 | -2.5421E+01 | -2.1629E-01 |
| A16 = | 0.0000E+00 | 0.0000E+00 | 0.0000E+00 |

| | Surface # | | |
|---|---|---|---|
| | 4 | 5 | 6 |
| K = | -8.0054E-01 | -9.9000E+01 | -5.5292E+00 |
| A4 = | 9.0164E-01 | -3.7734E-01 | -3.1617E-01 |
| A6 = | -1.8462E+00 | 1.6383E-02 | 2.8781E-01 |
| A8 = | 1.9120E+00 | 2.7123E-01 | -1.9384E-01 |

TABLE 18-continued

Aspheric Coefficients

| A10 = | 4.3145E-01 | -1.2171E-01 | 8.7674E-02 |
|---|---|---|---|
| A12 = | -2.9614E+00 | -8.8197E-02 | -2.5884E-02 |
| A14 = | 2.3473E+00 | 5.9471E-02 | 3.7622E-03 |
| A16 = | 0.0000E+00 | 0.0000E+00 | -6.2720E-05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| Embodiment 9 | | | |
|---|---|---|---|
| Fno | 2.20 | (T12 + CT2)/TD | 0.64 |
| FOV | 79.96 | f2/f | 0.58 |
| (R1 + R2)/(R1 - R2) | -0.47 | f/R2 | 0.69 |
| CT2/CT3 | 3.16 | N2 | 1.544 |
| (R3 + R4)/(R3 - R4) | 1.73 | N3 | 1.607 |
| R6/f | 0.24 | SD/TD | 1.00 |
| CT2/T12 | 1.89 | (R5 + R6)/(R5 - R6) | 1.84 |
| V2 - V3 | 29.30 | \| SAG_22/TD \| | 0.27 |
| \| V1 - V2 \| | 0.00 | R1/f | 0.52 |

In the present optical imaging lens, the lens elements can be made of plastic or glass. If the lens elements are made of plastic, the cost will be effectively reduced. If the lens elements are made of glass, there is more freedom in distributing the refractive power of the optical imaging lens. Plastic lens elements can have aspheric surfaces, which allow more design parameter freedom (than spherical surfaces), so as to reduce the aberration and the number of the lens elements, as well as the total track length of the optical imaging lens.

In the present optical imaging lens, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The optical imaging lens of the present invention can be used in focusing optical systems and can obtain better image quality. The optical imaging lens of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

While we have shown and described various embodiments in accordance with the present invention, it should be clear to those skilled in the art that further embodiments may be made without departing from the scope of the present invention.

What is claimed is:

1. An optical imaging lens comprising an aperture stop and an optical assembly, the optical assembly comprising: in order from an object side to an image side:

a first lens element with a positive refractive power having an aspheric object-side surface being convex near an optical axis and an aspheric image-side surface;

a second lens element with a positive refractive power having an aspheric object-side surface being concave near an optical axis and an aspheric image-side surface being convex near an optical axis, the second lens element being made of plastic material;

a third lens element with a negative refractive power having an aspheric object-side surface being convex near an optical axis and an aspheric image-side surface being concave near an optical axis, the third lens element being made of plastic material, at least one inflection point being formed on the object-side and the image-side surfaces of the third lens element;

the aperture stop being located between the image-side surface of the first lens element and an object to be photographed;

wherein a radius of curvature of the object-side surface of the first lens element is R1, a radius of curvature of the image-side surface of the first lens element is R2, a central thickness of the second lens element is CT2, a central thickness of the third lens element is CT3, and the following conditions are satisfied:

$-2.0<(R1+R2)/(R1-R2)<-0.2;$ $2.0<CT2/CT3<4.0.$

2. The optical imaging lens as claimed in claim 1, wherein a radius of curvature of the object-side surface of the second lens element is R3, a radius of curvature of the image-side surface of the second lens element is R4, and the following condition is satisfied:

$1.0<(R3+R4)/(R3-R4)<3.5.$

3. The optical imaging lens as claimed in claim 1, wherein a radius of curvature of the image-side surface of the third lens element is R6, a focal length of the optical imaging lens is f, and the following condition is satisfied:

$0.1<R6/f<0.36.$

4. The optical imaging lens as claimed in claim 3, wherein the central thickness of the second lens element is CT2, a distance along the optical axis between the first lens element and the second lens element is T12, and the following condition is satisfied:

$1.2<CT2/T12<2.5.$

5. The optical imaging lens as claimed in claim 1, wherein an Abbe number of the first lens element is V1, an Abbe number of the second lens element is V2, an Abbe number of the third lens element is V3, and the following conditions are satisfied:

$20<V2-V3<40;$ and $|V1-V2|<10.$

6. The optical imaging lens as claimed in claim 1, wherein a distance along the optical axis between the first lens element and the second lens element is T12, the central thickness of the second lens element is CT2, a distance along the optical axis between the object-side surface of the first lens element and the image-side surface of the third lens element is TD, and the following condition is satisfied:

$0.55<(T12+CT2)/TD<0.75.$

7. The optical imaging lens as claimed in claim 1, wherein a focal length of the optical imaging lens is f, a focal length of the second lens element is f2, and the following condition is satisfied:

$0.3<f2/f<1.5.$

8. The optical imaging lens as claimed in claim 7, wherein the focal length of the optical imaging lens is f, the radius of curvature of the image-side surface of the first lens element is R2, and the following condition is satisfied:

$-0.5<f/R2<1.$

9. The optical imaging lens as claimed in claim 8, wherein a refractive index of the second lens element is N2, a refractive index of the third lens element is N3, and the following conditions are satisfied:

$1.5<N2<1.58;$ and $1.57<N3<1.68.$

10. An optical imaging lens comprising an aperture stop and an optical assembly, the optical assembly comprising: in order from an object side to an image side:

a first lens element with a positive refractive power having an aspheric object-side surface being convex near an optical axis and an aspheric image-side surface;

a second lens element with a positive refractive power having an aspheric object-side surface being concave near an optical axis and an aspheric image-side surface being convex near an optical axis, the second lens element being made of plastic material;

a third lens element with a negative refractive power having an aspheric object-side surface being convex near an optical axis and an aspheric image-side surface being concave near an optical axis, the third lens element being made of plastic material, at least one inflection point being formed on the object-side and the image-side surfaces of the third lens element;

wherein a central thickness of the second lens element is CT2, a central thickness of the third lens element is CT3, an Abbe number of the first lens element is V1, an Abbe number of the second lens element is V2, an Abbe number of the third lens element is V3, a distance along the optical axis between the aperture stop and the image-side surface of the third lens element is SD, a distance along the optical axis between the object-side surface of the first lens element and the image-side surface of the third lens element is TD, and the following conditions are satisfied:

$2.0<CT2/CT3<4.0;$ $20<V2-V3<40$ and $|V1-V2|<10;$ $0.9<SD/TD<1.05.$

11. The optical imaging lens as claimed in claim 10, wherein a radius of curvature of the object-side surface of the third lens element is R5, a radius of curvature of the image-side surface of the third lens element is R6, and the following condition is satisfied:

$1.3<(R5+R6)/(R5-R6)<7.$

12. The optical imaging lens as claimed in claim 10, wherein a distance in parallel with the optical axis from an axial vertex on the image-side surface of the second lens element to a maximum effective radius position on the image-side surface of the second lens element is SAG_22, a distance along the optical axis between the object-side surface of the first lens element and the image-side surface of the third lens element is TD, and the following condition is satisfied:

$0.2<|SAG\_22/TD|<0.4.$

13. The optical imaging lens as claimed in claim 12, wherein a focal length of the optical imaging lens is f, a radius of curvature of the object-side surface of the first lens element is R1, and the following condition is satisfied:

$0.3<R1/f<1.5.$

14. The optical imaging lens as claimed in claim 10, wherein a focal length of the optical imaging lens is f, a focal length of the second lens element is f2, and the following condition is satisfied:

$0.3<f2/f<1.5.$

15. The optical imaging lens as claimed in claim 14, wherein a radius of curvature of the object-side surface of the first lens element is R1, a radius of curvature of the image-side surface of the first lens element is R2, and the following condition is satisfied:

$-2.0<(R1+R2)/(R1-R2)<-0.2.$

16. The optical imaging lens as claimed in claim 15, wherein a maximal field of view of the optical imaging lens is FOV, and the following condition is satisfied:

$75<FOV<95.$

17. The optical imaging lens as claimed in claim 10, wherein the central thickness of the second lens element is CT2, a distance along an optical axis between the first lens element and the second lens element is T12, and the following condition is satisfied:

$1.2<CT2/T12<2.5.$

* * * * *